(12) United States Patent
Pham et al.

(10) Patent No.: US 12,430,383 B2
(45) Date of Patent: Sep. 30, 2025

(54) ADJUSTING A PLAYLIST OF MEDIA CONTENT ITEMS

(71) Applicant: Spotify AB, Stockholm (SE)

(72) Inventors: Joshua Pham, Cambridge, MA (US); Rustam Zinurov, Stockholm (SE); Jeremy Theron Hopple, Jackson, WY (US); Andrew Joseph Asman, Ft. Wright, KY (US); Birgit Yao, Boston, MA (US); Gastón Montemayor Olaizola, New York, NY (US); Yu-Ting Ger, Riverdale, MD (US); Puja Maheshwari, New York, NY (US); Gabriel Joshua Heafitz, Glen Rock, NJ (US)

(73) Assignee: Spotify AB, Stockholm (SE)

( * ) Notice: Subject to any disclaimer, the term of this patent is extended or adjusted under 35 U.S.C. 154(b) by 104 days.

(21) Appl. No.: 18/045,086

(22) Filed: Oct. 7, 2022

(65) Prior Publication Data
US 2023/0169113 A1 Jun. 1, 2023

Related U.S. Application Data

(60) Provisional application No. 63/273,783, filed on Oct. 29, 2021.

(51) Int. Cl.
*G06F 16/638* (2019.01)
*G06F 3/0482* (2013.01)
(Continued)

(52) U.S. Cl.
CPC ......... *G06F 16/639* (2019.01); *G06F 3/0482* (2013.01); *G06F 3/0483* (2013.01);
(Continued)

(58) Field of Classification Search
CPC ....... G06F 16/683; G06F 16/68; G06F 16/639
(Continued)

(56) References Cited

U.S. PATENT DOCUMENTS 7,743,009 B2 * 6/2010 Hangartner ...... H04N 21/26258
706/46
10,242,098 B2 * 3/2019 Koenigstein ............ G06F 16/68
(Continued)

OTHER PUBLICATIONS

Soderstrom, Office Action, U.S. Appl. No. 18/048,003, Nov. 1, 2023, 35 pgs.

(Continued)

*Primary Examiner* — Alexander Krzystan
(74) *Attorney, Agent, or Firm* — Morgan, Lewis & Bockius LLP

(57) ABSTRACT

This disclosure is directed to adjusting a playlist of media-content items. One aspect is a method comprising receiving a request to adjust a playlist comprising initial media-content items, in response to receiving the input requesting the playlist be adjusted, compiling a set of features for the playlist and selecting a strong seed media-content item from the initial media-content items as a strong seed, predicting scores for a plurality of candidate media-content items based at least in part on the set of features for the playlist and the strong seed, the scores indicating a likelihood that a corresponding candidate media-content item will be added to the playlist, and inserting a candidate media-content item of the plurality of candidate media-content items after the strong seed media-content item based at least in part on the scores predicted for the plurality of candidate media-content items.

20 Claims, 13 Drawing Sheets

(51) Int. Cl.
*G06F 3/0483* (2013.01)
*G06F 16/635* (2019.01)
*G06F 16/64* (2019.01)
*G06F 16/735* (2019.01)
*G06F 16/783* (2019.01)

(52) U.S. Cl.
CPC ............ *G06F 16/635* (2019.01); *G06F 16/64* (2019.01); *G06F 16/735* (2019.01); *G06F 16/783* (2019.01)

(58) Field of Classification Search
USPC .......................................................... 700/94
See application file for complete search history.

(56) References Cited

U.S. PATENT DOCUMENTS

| | | | |
|---|---|---|---|
| 10,645,455 B1* | 5/2020 | Glaeser | H04N 21/4666 |
| 11,086,936 B2 | 8/2021 | Lamere et al. | |
| 2006/0195516 A1 | 8/2006 | Beaupre | |
| 2009/0063975 A1 | 3/2009 | Bull et al. | |
| 2010/0162115 A1 | 6/2010 | Ringewald et al. | |
| 2012/0088477 A1 | 4/2012 | Cassidy | |
| 2012/0209972 A1 | 8/2012 | Wong et al. | |
| 2014/0115114 A1 | 4/2014 | Garmark et al. | |
| 2015/0039644 A1 | 2/2015 | Trivedi | |
| 2015/0113407 A1 | 4/2015 | Hoffert et al. | |
| 2015/0212668 A1 | 7/2015 | Olofsson | |
| 2015/0213018 A1 | 7/2015 | Sanio et al. | |
| 2015/0237389 A1 | 8/2015 | Grouf et al. | |
| 2016/0050446 A1 | 2/2016 | Fujioka et al. | |
| 2016/0299906 A1 | 10/2016 | Cartoon et al. | |
| 2016/0379274 A1* | 12/2016 | Irwin | G06Q 30/0271 705/14.67 |
| 2017/0212644 A1 | 7/2017 | Alsina et al. | |
| 2017/0238039 A1 | 8/2017 | Sabattini | |
| 2017/0357479 A1 | 12/2017 | Shenoy et al. | |
| 2018/0015369 A1 | 1/2018 | Schupak et al. | |
| 2018/0121432 A1 | 5/2018 | Parson et al. | |
| 2018/0189306 A1 | 7/2018 | Lamere et al. | |
| 2018/0196806 A1 | 7/2018 | Scapa et al. | |
| 2018/0268054 A1 | 9/2018 | Mustain et al. | |
| 2018/0322195 A1 | 11/2018 | Lee et al. | |
| 2019/0095891 A1 | 3/2019 | Backman et al. | |
| 2019/0268392 A1 | 8/2019 | Santangelo et al. | |
| 2019/0377749 A1 | 12/2019 | Manning et al. | |
| 2020/0137464 A1 | 4/2020 | Lewis et al. | |
| 2020/0320115 A1 | 10/2020 | Lewis et al. | |
| 2021/0044640 A1* | 2/2021 | He | G10L 15/26 |
| 2021/0141592 A1 | 5/2021 | Reese et al. | |
| 2021/0342952 A1* | 11/2021 | Putnam | A63B 71/0622 |
| 2022/0067088 A1 | 3/2022 | Aryan | |
| 2022/0067100 A1 | 3/2022 | Lamere et al. | |
| 2022/0207081 A1* | 6/2022 | Ding | G06F 3/167 |
| 2023/0169113 A1* | 6/2023 | Pham | G06F 16/635 700/94 |

OTHER PUBLICATIONS

Soderstrom, Notice of Allowance, U.S. Appl. No. 18/048,003, Apr. 15, 2024, 10 pgs.

Soderstrom, Notice of Allowance, U.S. Appl. No. 18/048,003, Aug. 5, 2024, 11 pgs.

Yun He et al., Consistency-aware recommendation for user-generated item list continuation, In The Thirteenth ACM International Conference on Web Search and Data Mining, Dec. 30, 2019, 9 pgs.

Soderstrom, Office Action, U.S. Appl. No. 18/935,303, Aug. 11, 2025, 70 pgs.

* cited by examiner

ADJUSTING A PLAYLIST OF MEDIA CONTENT ITEMS

CROSS-REFERENCE TO RELATED APPLICATION(S)

This application claims priority to U.S. Provisional Application No. 63/273,783, filed on Oct. 29, 2021, titled "SYSTEMS AND METHODS FOR INTERLEAVING RECOMMENDED MEDIA ITEMS IN A PLAYLIST" the disclosure of which is hereby incorporated by reference in its entirety.

BACKGROUND

Some media content applications include features for creating and consuming playlists. Typically, a playlist comprises a collection of media content items (e.g., songs, videos, or tracks) which are grouped together. In some examples, users create their own playlists. In some examples, a user can add a playlist curated by the media content provider or by another user of the media content provider. In some embodiments, media content providers recommend media content items. For example, some media content providers automatically select and present media content items. For example, a music streaming service may select and present songs to generally match the experience of listening to the radio.

SUMMARY

In general terms, this disclosure is directed to systems and methods for adjusting a playlist of media content items. In some embodiments, a machine learning model is used to predict scores for a plurality of candidate media content items, where a candidate media content item is inserted into a playlist based at least in part on the scores predicted for the plurality of candidate media content items and the scores indicate a likelihood a given user will add a given candidate media content item to the existing playlist.

One aspect is a method of adjusting a playlist comprising initial media content items, the method comprising receiving a request to adjusting the playlist comprising the initial media content items, in response to receiving the input requesting the playlist be adjusted, compiling a set of features for the playlist and selecting a strong seed media content item from the initial media content items as a strong seed, predicting scores for a plurality of candidate media content items based at least in part on the set of features for the playlist and the strong seed, the scores indicating a likelihood that a corresponding candidate media content item will be added to the playlist, and inserting a candidate media content item of the plurality of candidate media content items after the strong seed media content item based at least in part on the scores predicted for the plurality of candidate media content items.

Another aspect is a media playback system comprising one or more servers configured to operate a playlist adjuster, the playlist adjuster configured to receive, from a media playback device, a request to adjust a playlist comprising initial media content items, retrieve a set of features for the playlist, a strong seed associated with one of the initial media content items, and a plurality of candidate media content items, predict scores for the plurality of candidate media content items based at least in part on the set of features for the playlist and the strong seed, wherein the scores indicate a likelihood that a corresponding candidate media content item will be added to the playlist, and provide, to the media playback device, a candidate media content item of the plurality of candidate media content items and a location within the playlist to insert the candidate media content item.

A further aspect is a media playback device comprising at least one processor, and a memory storing instructions which, when executed by the at least one processor, cause the media playback device to generate a graphical user interface (GUI) to display a playlist comprising initial media content items and an adjust playlist control, receive an input, at the GUI, selecting the adjust playlist control, send, to a media playback system, a request to adjust the playlist, wherein the media playback system is configured to compile a set of features for the playlist, select a strong seed media content item from the initial media content items as a strong seed, and predict scores for a plurality of candidate media content items based on the set of features for the playlist and the strong seed and insert a candidate media content item from the plurality of candidate media content items in the playlist, wherein the scores indicate a likelihood that a corresponding candidate media content item will be added to the playlist, receive, from the media playback system, the playlist with the inserted candidate media content item, and update the GUI to display the playlist with the inserted candidate media content item.

BRIEF DESCRIPTION OF THE DRAWINGS

Various embodiments will be described in detail with reference to the drawings, wherein like reference numerals represent like parts and assemblies throughout the several views.

DETAILED DESCRIPTION

Figure 1:
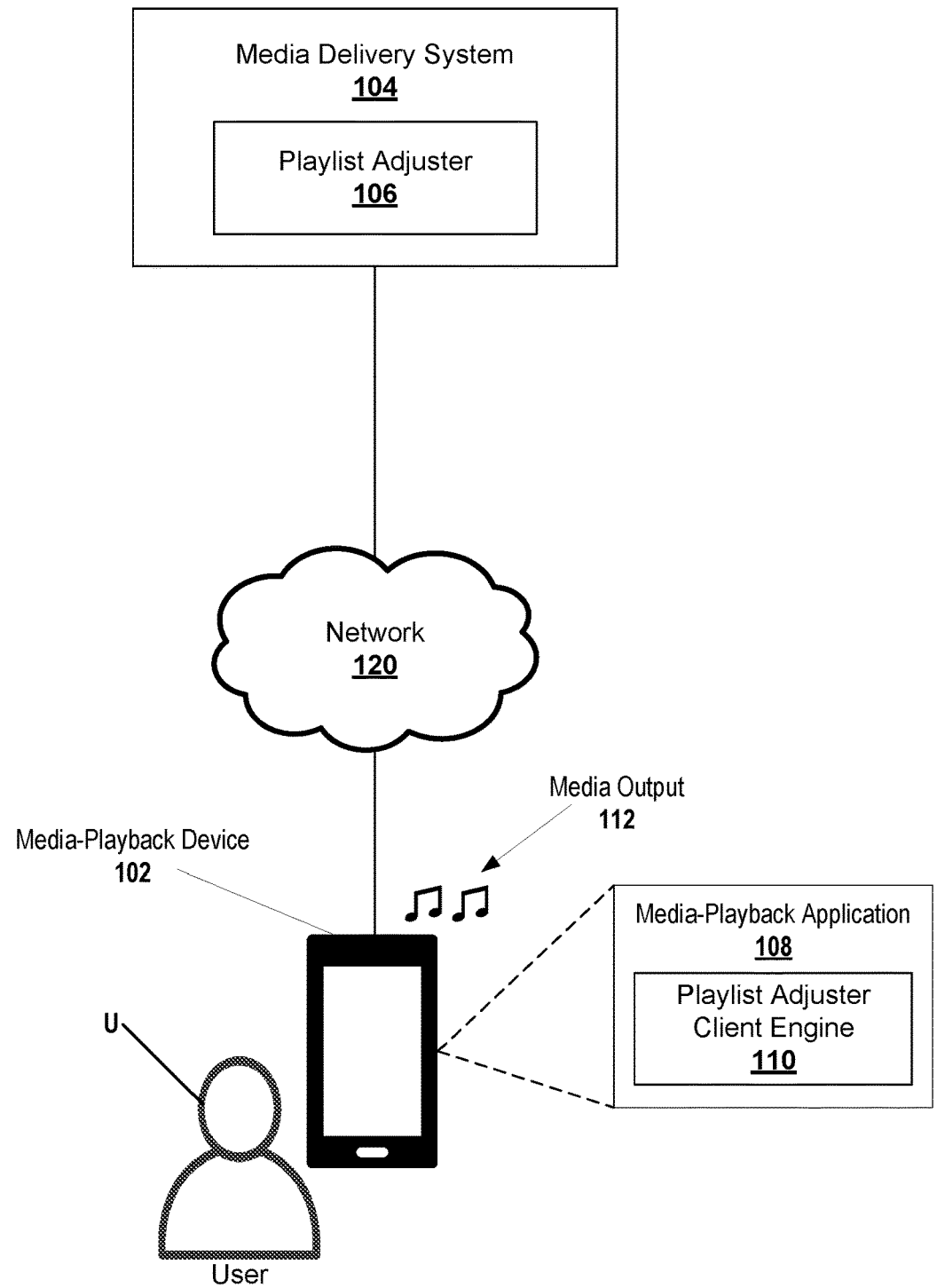
FIG. 1 illustrates an example environment for a playlist adjuster.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to systems and methods for adjusting a playlist of media content items. In some embodiments, a machine learning model is used to predict scores for a plurality of candidate media content items. Recommended media content items are selected from the plurality of candidate media content items based, at least in part, on the predicted scores.

In some embodiments, a user of a media-playback application selects a playlist to launch a graphical user interface (GUI) displaying information for one or more initial media content items in the playlist. In some of these embodiments, an adjust playlist button is displayed on the GUI. Once the adjust playlist button is selected, a playlist adjuster, typically hosted by one or more servers, identifies and recommends media content items for the playlist. In some embodiments, recommended media content items are presented in response to a media casting operating (e.g., when a user casts playback from a media playback device to an audio or video reproduction device). In some embodiments, recommended media content items are provided in response to a user initiating a shared listening, social listening, or group listening session with one or more other users. A group listening session includes session where a playback state is shared across devices to synchronize the playback across devices or when multiple users share control of one or more devices. For example, when a new user joins a a playback group listening session new media content items may be recommended for the group based on the features of the group of users.

The playlist adjuster interleaves the recommended candidate media content items into the original playlist. For example, recommended candidate media content items can be inserted as every third media content item in the playlist. In some embodiments, the recommended candidate media content items are displayed with an indicator that the media content item was added to the playlist by the playlist adjuster (e.g., a visual icon in the panel of the media content item displayed within the playlist). In some embodiments, recommended media content items are interleaved into a user's current or upcoming playback queue.

In some embodiments, the recommended media content items are displayed with an add control and a remove control. In some embodiments, the recommended media content items are displayed with a playlist adjusting control. For example, a single button may be displayed for adding the recommended media content item to the playlist. In some embodiments, the add control and remove control are displayed simultaneously next to each of the recommended media content items. The add control is selectable to add the respective recommended media content item to the playlist. The remove control is selectable to remove the respective recommended media content item.

In some embodiments, the selections of the add and remove controls are monitored and the user selections are used as labeled data (e.g., whether a control was clicked or not clicked) to train/further refine a machine learning model that predicts recommended media content items. For example, recommended media content items which receive an add control selection from the user are used as positive training examples and the recommended media content items which receive a remove control selection from the user are used as negative training examples. In some embodiments, other interactions are used to label the recommended media content items. For example, a user pressing a skip button within a predetermined time of starting the playback of the recommended media content item can be used to label the recommended media content item as a negative training example. Another example includes when a user selects a media casting operation (e.g., indicating the user approves of the recommendation). A media casting operation includes casting the media playback from the media playback device to a media reproduction device.

In some embodiments, when the add control is selected, the playlist adjuster adds the recommended media content item to the playlist and also provides additional recommended media content items. In some embodiments, the additional recommended media content items are based, at least in part on the recommended media content item that was added to the playlist. In some embodiments, three additional recommended media content items are displayed below the added media content item.

In some embodiments, the machine learning model is continuously trained as more user interactions and selections are logged. For example, a user's selections for adding or removing recommended media content items are logged and used to further train the machine learning model. This allows the model to provide better recommendations by learning from the user's previous inputs.

In some embodiments, the machine learning model performs: scoring, ranking, and sequencing of media content items. For example, a set of candidate tracks are provided to the machine learning model. Each of the candidate tracks is scored by the machine learning model, the score estimating a likelihood (e.g., represented from 0 to 1) that the user will add the track to the playlist. The candidate tracks are then ranked at least in part on the scores, so that the tracks with the highest scores are ranked highest. The highest ranked tracks are then selected for insertion into the playlist. The playlist is then analyzed along with the highest ranked tracks to determine a recommended sequence of the recommended tracks in the playlist. The tracks are then inserted into the playlist with that sequence.

In some configurations, after the user has interacted with the recommendations to add or remove certain recommended media content items, the enhance button can be toggled off and then on to remove the recommendations and then provide a new set of recommendations. The new set of recommendations is provided by the trained machine learning model based upon the knowledge gained from the user's prior selections of the add and remove controls.

In some embodiments, a user can add or remove one or more existing media content items in the initial playlist. In some embodiments, one or more of the existing media content items in the initial playlist may be set to inactive by a suer, where the playback of the playlist skips the media content items set to inactive. In some embodiments, the existing media content items may be shuffled when a user initiates the playlist adjuster feature and/or finalizes the playlist after completing the playlist adjustment process.

FIG. 1 illustrates an example environment 100 for a playlist adjuster 106. The environment includes a media delivery system 104 including or configured to operate with a playlist adjuster 106, a media playback device 102 operating a media playback application 108 with a playlist adjuster client engine 110. The media playback device 102 is operated by a user U and is configured to output media output 112. The media playback device 102 is in digital communication with the media delivery system 104 via the network 120.

Figure 2:
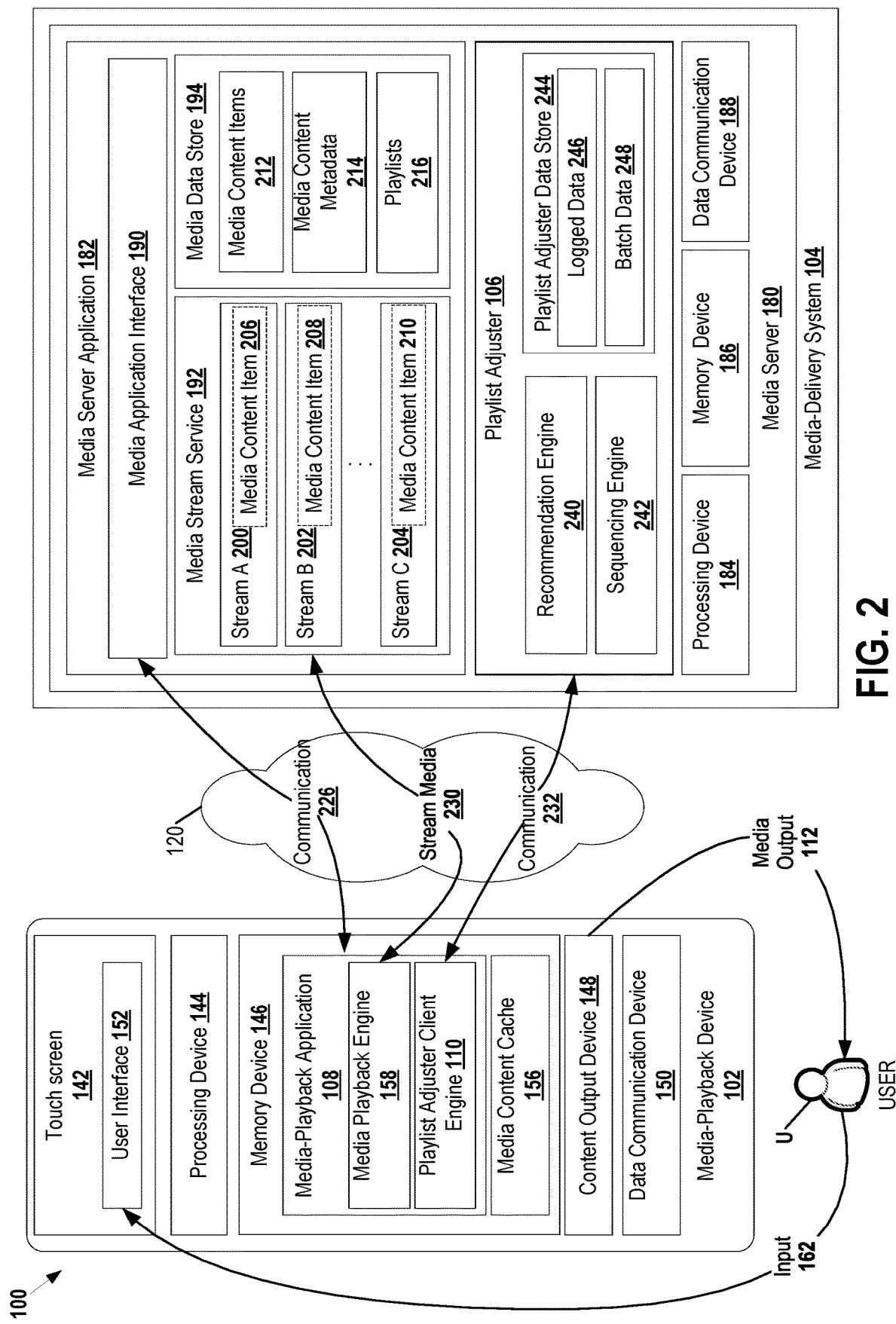
FIG. 2 illustrates a schematic illustration of the example environment shown FIG. 1 for a playlist adjuster.

The media delivery system 104 operates to provide media content to the media playback device 102. In some examples, the media delivery system 104 provides the media content items using the network 120. A media content item is an item of media content, including audio, video, or other types of media content which may be stored in any format suitable for storing media content. Non-limiting examples of media content items include songs, albums, music videos, movies, television episodes, podcasts, other types of audio or video content, and portions or combinations thereof. An example media delivery system 104 is illustrated in FIG. 2.

In some embodiments, the media delivery system 104 operates a playlist adjuster 106. The playlist adjuster 106 operates to insert recommended media content items into existing playlists. In some embodiments, the playlist adjuster 106 inserts recommended media content items into an existing playlist in response to receiving a request to adjust the existing playlist. In some embodiments, the playlist adjuster 106 receives features for scoring candidate media content items in near-real time where the recommended media content item inserted into the existing playlist is identified from the candidate media content items based on the predicted scores. In some embodiments, the scores are in a range from 0 to 1 associated with a probability that a user would add the candidate media content item to the playlist. In some embodiments, the predicted scores are provided by a machine learning model trained to predict recommended songs for an existing playlist based on features for the playlist and a selected media content item in the existing playlist as a strong seed. In some embodiments, there are multiple strong seeds each associated with a media content item in the existing playlist. In some embodiments, a user interacting with a playlist with recommended candidate media content items interacts with the media content item in a manner that gives an indication of whether the user likes the recommendation and/or whether the user added the recommendation to the existing playlist. In some embodiments, the playlist is a curated playlist or a playlist made by the user and the recommended media content items are based on features in the playlist as well as personalized features of the user. Examples of the playlist adjuster 106 are illustrated and described in reference to FIGS. 2 and 4.

The media playback device 102 operates to play media content items and produce media output 112. In some embodiments, the media content items are retrieved from the media delivery system 104. The media playback device 102 is typically a computing device with a communication interface, which can connect to the network 120. Examples of the media playback device 102 include a computing device, gaming counsel, mobile computing device, tablet, smartphone, and a smart speaker. The user U operates the media playback device 102. An example of the media playback device 102 is illustrated and described in reference to FIG. 2.

In some embodiments, the media playback device 102 operates a media playback application 108 to play the media content items. An example of the media playback application 108 is illustrated and described in reference to FIG. 2. In the example shown in FIG. 1, the media playback application 108 operates a playlist adjuster client engine 110.

The playlist adjuster client engine 110 operates with the playlist adjuster 106 to recommend and present media content items to add to an existing playlist. In some embodiments, the playlist adjuster client engine 110 generates user interface elements to initiate a playlist adjuster process, present recommended media content items within an existing playlist, and/or to receive user feedback on the recommended media content items (e.g., to add or remove a particular recommended media content item). In some embodiments, additional media content items are recommended in response to receiving user feedback in near-real time. In some embodiments, the playlist adjuster client engine 110 operates to record/login user interactions, encrypt and/or anonymize the recorded interaction data and provide the encrypted and/or anonymized interaction data to the media delivery system 104. An example of the playlist adjuster client engine 110 is illustrated and described in reference to FIG. 2.

In some embodiments, the playlist adjuster 106 is stored locally at the media playback device 102. In these embodiments, the playlist adjuster 106 operates without requiring the media playback device 102 to engage with the media delivery system 104. In some embodiments, one or more of the media content items stored on the media playback device 102 are recommended to be inserted in the playlist. For example, a library of media content items may be stored on the media playback device and songs from this library are recommended to be added to the playlist. In some of these embodiments, the library of media content items includes media content items a user has "liked" or saved. In some embodiments, the media content items and initial playlist are stored on the media playback device 102 and playlist adjuster 106 executes on the media playback device 102 such that the media playback device 102 may be disconnected from the network and still recommended media content items.

The network 120 connects media playback devices, including the media playback device 102, to the media delivery system 104. In some examples, the network 120 is a public network, such as the Internet. In example embodiments, the network 120 may communicatively connect with media playback devices directly or indirectly through a Wi-Fi® network or a cellular network or through a middleware network/communication device.

FIG. 2 illustrates a schematic illustration of the example environment 100 shown in FIG. 1 for a playlist adjuster. The environment 100 includes a media playback device 102, which communicates with the media delivery system 104 via the network 120. Also shown is a user U.

The media playback device 102 plays media content items. In some embodiments, the media playback device 102 plays media content items that are provided (e.g., streamed, transmitted, etc.) by a system external to the media playback device 102 such as the media delivery system 104, another system, or a peer device. Alternatively, in some embodiments, the media playback device 102 plays media content items stored locally on the media playback device 102. Further, in at least some embodiments, the media playback device 102 plays media content items that are stored locally as well as media content items provided by other systems.

In some embodiments, the media playback device 102 is a portable computing device. Such a portable computing device includes a handheld entertainment device, smartphone, tablet, watch, wearable device, or any other type of device capable of playing media content. In other embodiments, the media playback device 102 is a laptop computer, desktop computer, smart speaker, or other computing consoles.

In at least some embodiments, the media playback device 102 includes a touch screen 142, a processing device 144, a memory device 146, a content output device 148, and a data communication device 150. Other embodiments may include additional, different, or fewer components.

The touch screen 142 operates to receive an input 162 from a selector (e.g., a finger, stylus etc.) controlled by the user U. In some embodiments, the touch screen 142 operates as both a display device and a user input device. In some embodiments, the touch screen 142 detects inputs based on one or both of touches and near-touches. In some embodiments, the touch screen 142 displays a user interface 152 for interacting with the media playback device 102. As noted above, some embodiments do not include a touch screen 142. Some embodiments include a display device and one or more separate user interface devices. Further, some embodiments do not include a display device. For example, a smart speaker.

In some embodiments, the processing device 144 comprises one or more central processing units (CPU). In other embodiments, the processing device 144 additionally or alternatively includes one or more digital signal processors, field-programmable gate arrays, or other electronic circuits.

The memory device 146 typically includes at least some form of computer-readable media. Computer-readable media includes any available media that can be accessed by the media playback device 102. By way of example, computer-readable media includes computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read-only memory, electrically erasable programmable read-only memory, flash memory and other memory technology, compact disc read-only memory, Blueray® discs, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The memory device 146 operates to store data and instructions. In some embodiments, the memory device 146 stores instructions for a media playback application 108 and a media content cache 156.

The memory device 146 includes a media playback application 108. In some embodiments, the media playback application 108 comprises a media playback engine 158 and a playlist adjuster client engine 110.

Some embodiments of the media playback application 108 include a media playback engine 158. The media playback engine 158 operates to play media content to the user U. As described herein, the media playback engine 158 is configured to communicate with the media delivery system 104 to receive one or more tracks (for example, through the streaming media channel 230). In other embodiments, the media playback engine 158 is configured to play media content that is locally stored in the media playback device 102.

In some embodiments, the media playback engine 158 operates to retrieve one or more tracks that are either locally stored in the media playback device 102 or remotely stored in the media delivery system 104. In some embodiments, the media playback engine 158 is configured to send a request to the media delivery system 104 for tracks and receive information about such tracks for playback.

Figure 11:
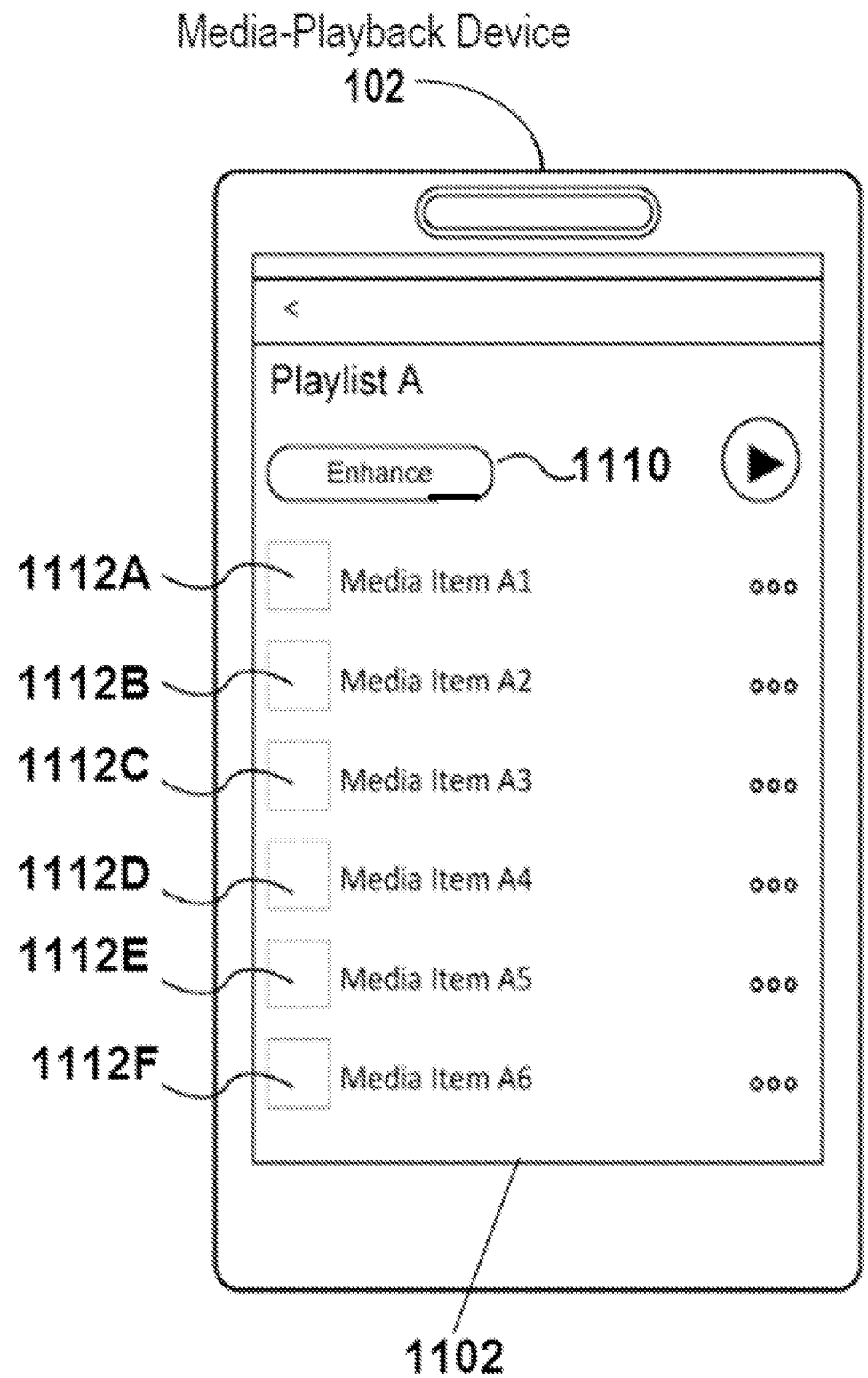
FIG. 11 illustrates an example user interface for a media-playback application presenting a playlist and configured to operate with the playlist adjuster.
Figure 12:
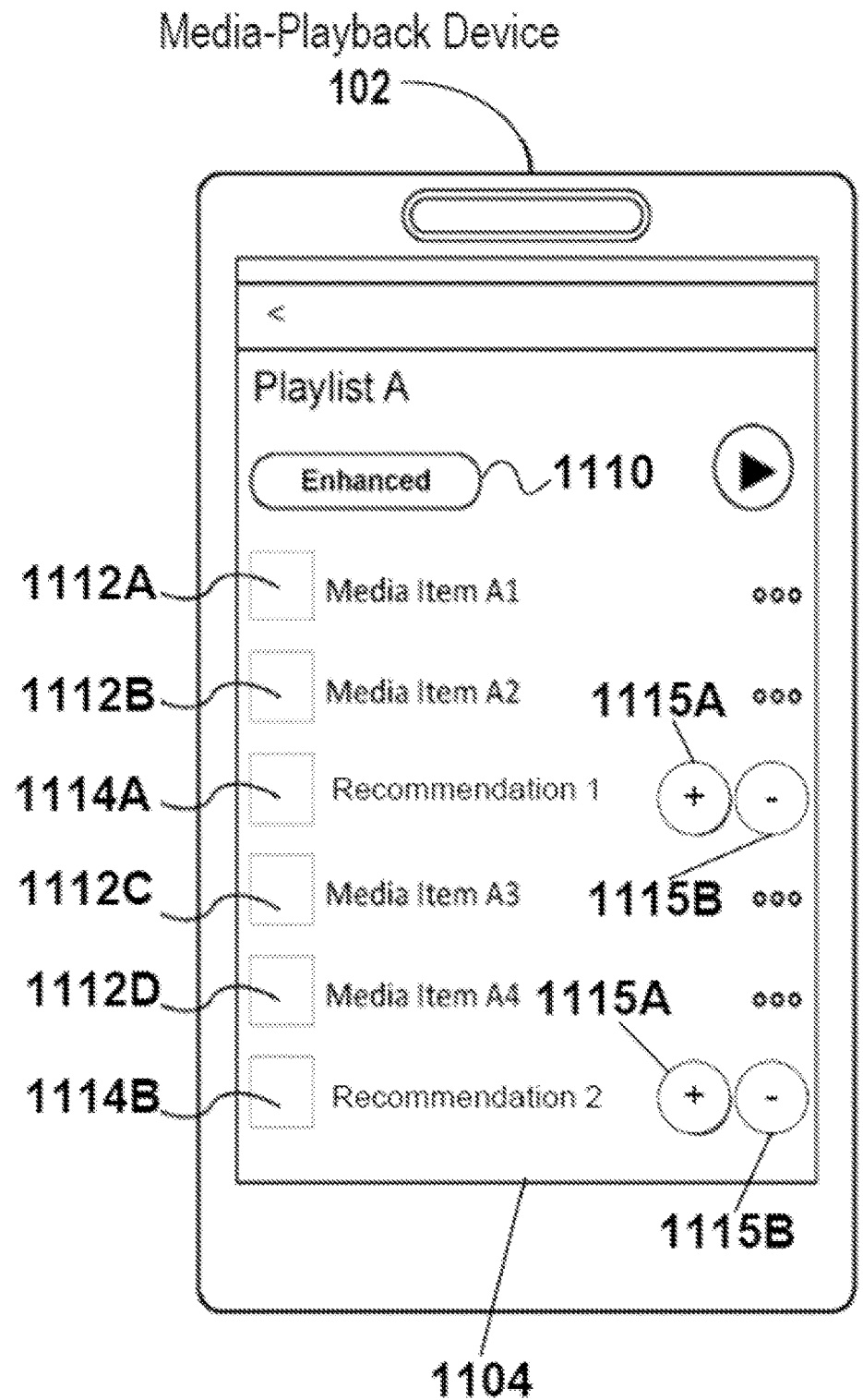
FIG. 12 illustrates an example user interface for a media-playback application presenting media content items recommended by the playlist adjuster.

In some embodiments, the media playback application 108 includes a playlist adjuster client engine 110. In the embodiment shown, the playlist adjuster client engine 110 interfaces with the playlist adjuster 106 via the communication channel 232. In some embodiments, the playlist adjuster client engine 110 operates with the playlist adjuster 106 to recommend and present media content items to add to an existing playlist. In some embodiments, a user selects a playlist as part of the media playback engine which launches a GUI presenting the media content items in a playlist with a button to initiate a playlist adjuster process. For example, the user interface 1102 as shown in FIG. 11. In some embodiments, the playlist adjuster client engine 110 sends a request to the playlist adjuster for an adjusted playlist with one or more recommended media content items inserted in an existing playlist. In some embodiments, the playlist adjuster client engine 110 presents controls to add or remove a recommended media content item from an existing playlist. For example, as shown in the user interface 1104 as shown in FIG. 12. In some embodiments, if a user selects an add control for a recommended media content item, the playlist adjuster client engine 110 sends a request for additional recommended media content items. In some embodiments, the playlist adjuster 106 will return an updated playlist with a set number (e.g., 2, 3, 5, 10, etc.) of recommended media content items below the newly added recommended media content items. In some embodiments, when a user selects an add control for a recommended media content item the recommended media content item is selected as the next strong seed. The next strong seed for the recommended media content item is provided to the machine learning model to score candidate media content items, a selection of which are inserted into the playlist (sometimes directly after the added recommended media content item) based at least in part on scores output from the machine learning model. In some embodiments, the playlist adjuster client engine 110 logs user interactions. In these embodiments, the playlist adjuster client engine 110 may encrypt and/or otherwise anonymize the interaction data before sending the interaction data to the playlist adjuster 106.

In some embodiments, the playlist adjuster client engine 110 allows a user to adjuster a playlist in near real time, wherein updated recommendations are provided as a user initiates a playlist adjuster process, makes selections adding or removing media content items, and otherwise interacts with the existing playlist. In some embodiments, the playlist can start with a new playlist where an initial set of recommendations are provided based on the type of music the user typically listens to or other user metrics.

Some embodiments of the memory device 146 also include a media content cache 156. The media content cache 156 stores media content items, such as media content items that have been previously received from the media delivery system 104. The media content items stored in the media content cache 156 can be stored in an encrypted or unencrypted format. The media content cache 156 can also store metadata about media-content items such as title, artist name, album name, length, genre, mood, era, etc. The media content cache 156 can also store playback information about the media content items, such as the number of times the user has requested to playback the media content item or the current location of playback (e.g., when the media content item is an audiobook, podcast, movie, or the like for which a user may wish to resume playback).

The content output device 148 operates to output media content. In some embodiments, the content output device 148 generates the media output 112 for the user(s). Examples of the content output device 148 include a speaker, an audio output jack, a Bluetooth® transmitter, a display panel, and a video output jack. Other embodiments are possible as well. For example, the content output device 148 may transmit a signal through the audio output jack or Bluetooth® transmitter that can be used to reproduce an audio signal by a connected or paired device such as headphone or a speaker.

The data communication device 150 operates to enable the media playback device 102 to communicate with one or more computing devices over one or more networks, such as the network 120. For example, the data communication device 150 is configured to communicate with the media delivery system 104 and receive media content from the media delivery system 104 at least partially via the network 120. The data communication device 150 can be a network interface of various types which connects the media playback device 102 to the network 120. Examples of the data communication device 150 include wired network interfaces and wireless network interfaces. Wireless network interfaces can include or be implemented with technologies including infrared technology, Bluetooth® wireless technology, Bluetooth® low energy technology, 802.11a/b/g/n/ac technology, cellular technology, or radio frequency interface technology, among others. Examples of cellular network technologies include LTE, WIMAX, UMTS, CDMA2000, GSM, cellular digital packet data (CDPD), and MOBITEX.

The environment 100 further includes a media delivery system 104. The media delivery system 104 comprises one or more computing devices and provides media content items to the media playback device 102 and, in some embodiments, other media playback devices as well. The media delivery system 104 includes a media server 180. Although FIG. 2 shows a single media server 180, some embodiments include multiple media servers or other servers. In these embodiments, each of the multiple servers may be identical or similar and may provide similar functionality (e.g., to provide greater capacity and redundancy, or to provide services from multiple geographic locations). Alternatively, in these embodiments, some of the multiple servers may perform specialized functions to provide specialized services (e.g., services to enhance media content playback during travel, etc.). Various combinations thereof are possible as well.

The media server 180 transmits stream media to media playback devices such as the media playback device 102. In some embodiments, the media server 180 includes a media server application 182, a processing device 184, a memory device 186, and a data communication device 188. The processing device 184, memory device 186, and the data communication device 188 may be similar to the processing device 144, memory device 146, and the data communication device 150 respectively, which have each been previously described.

In some embodiments, the media server application 182 streams music or other audio, video, or other forms of media content. The media server application 182 includes a media stream service 192, a media data store 194, and a media application interface 190. The media stream service 192 operates to buffer media content such as media content items 206, 208, and 210, for streaming to one or more streams 200, 202, and 204. The streams are sent to one or more media playback devices over a streaming media channel 230 over the network 120.

The media application interface 190 can receive requests or other communication from media playback devices or other systems, to retrieve media content items from the media server 180. In some examples, the media application interface 190 operates to establish a communication channel 226 with one or more media playback devices over the network 120.

In some embodiments, the media data store 194 stores media content items 212, media content metadata 214, and playlists 216. The media data store 194 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The playlist adjuster 106 operates recommended media content items to add to an existing playlist and insert the recommended media content items into the existing playlist. In the embodiment shown, the playlist adjuster 106 includes a recommendation engine 240, a sequencing engine 242, and a playlist adjuster data store 244. The playlist adjuster 106 interfaces with the playlist adjuster client engine 110 via the communication channel 232. Another example of the playlist adjuster 106 is illustrated and described in reference to FIG. 4.

The recommendation engine 240 operates to recommend media content items to add to an existing playlist. In some embodiments, the recommendation engine 240 scores a set of candidate media content items, where the recommended media content items are determined at least in part based on the scores. In some embodiments, the scores are in a range from 0 to 1 associated with a probability that a user would add the candidate media content item to the playlist. In some embodiments, the candidate media content items are retrieved from the media data store 194. For example, from the media content items 212 using a service to identify candidate media content items. In some embodiments, the candidate media content items are scored using a machine learning model. In some embodiments, the machine learning model receives playlists features as an input. In some embodiments, the playlist features are aggregated from the information stored in the media data store (e.g., the playlists 216). An example method 900 for training a machine learning model to score candidate media content items is illustrated and described in reference to FIG. 10. Another example of the recommendation engine 240 is illustrated and described in reference to FIG. 4. An example system flow diagram illustrating a process 500 for using the recommendation engine 240 within the playlist adjuster 106 is illustrated and described in reference to FIG. 5.

The sequencing engine 242 operates to insert recommended media content items within an existing playlist. In some embodiments, the sequencing engine 242 inserts recommended media content items in a pattern after one or more initial media content items. For example, recommended media content items can be inserted after every third initial media content item in the playlist. In some of these embodiments, the sequencing engine 242 may determine which candidate media content item to insert based on the scores assigned to the media candidate items by the recommendation engine 240. In some embodiments, the sequencing engine 242 further determines where to place recommended media content items based on the tracks surrounding the location where the recommended media content item is being inserted. For example, meta data assigned to the media content items before and after the recommended media content item can be analyzed to determine which candidate media content item should be recommended at a given location in the initial playlist. Examples of media content metadata include characteristics, genre, energy, etc. In some embodiments, the sequencing engine 242 uses a machine learning model to predict optimal candidate media content items to insert at a location. In some embodiments, the sequencing engine 242 determines which locations in a playlist recommended media content items should be inserted. Another example of the sequencing engine 242 is illustrated and described in reference to FIG. 4. An example system flow diagram for a process 600 for using the sequencing engine is illustrated and described in reference to FIG. 6.

The playlist adjuster data store 244 stores data used by the playlist adjuster 106. In some embodiments, the playlist adjuster data store 244 is stored at a specialized computing system for securing the stored data and compiling with personal data regulation and best practices. In some embodiments, the data stored at the adjuster data store is encrypted with a hash or otherwise anonymized to protect the personal data. The playlist adjuster data store 244 includes logged data 246, and batch data 248.

The logged data 246 includes logged user interactions with media content items and playlists. In some embodiments, the logged data 246 is updated as a user interacts with the media playback application and/or as a user interacts with a particular playlist. In some embodiments, the logged interactions include whether a user added or removed a recommended media content item to a playlist. In some embodiments, the logged data includes other interactions, such as how long the user listened to a particular track, whether the user skipped a track, at what point in a media content item did a user skip or change the output, location where a media content item was listened to, a device connected to the media playback device to output the media content etc. In some embodiments, the logged interactions include, but are not limited to, information about the user's interaction history such as commenting, payment of one or more media content items, interactions with the content creator (e.g., tipping, sending emojis, sending messages etc.). In some embodiments, the logged data is compiled and fed to the machine learning model to further train the machine learning model to recommend media content items. The logged data can also track changes to a playlist.

In some embodiments, the playlist adjuster data store 244 stores batch data. Examples of batch data 248 includes user language preferences, user location, static account information, user account information etc. In some embodiments, the batch data 248 includes user provided personal preferences.

Figure 3:
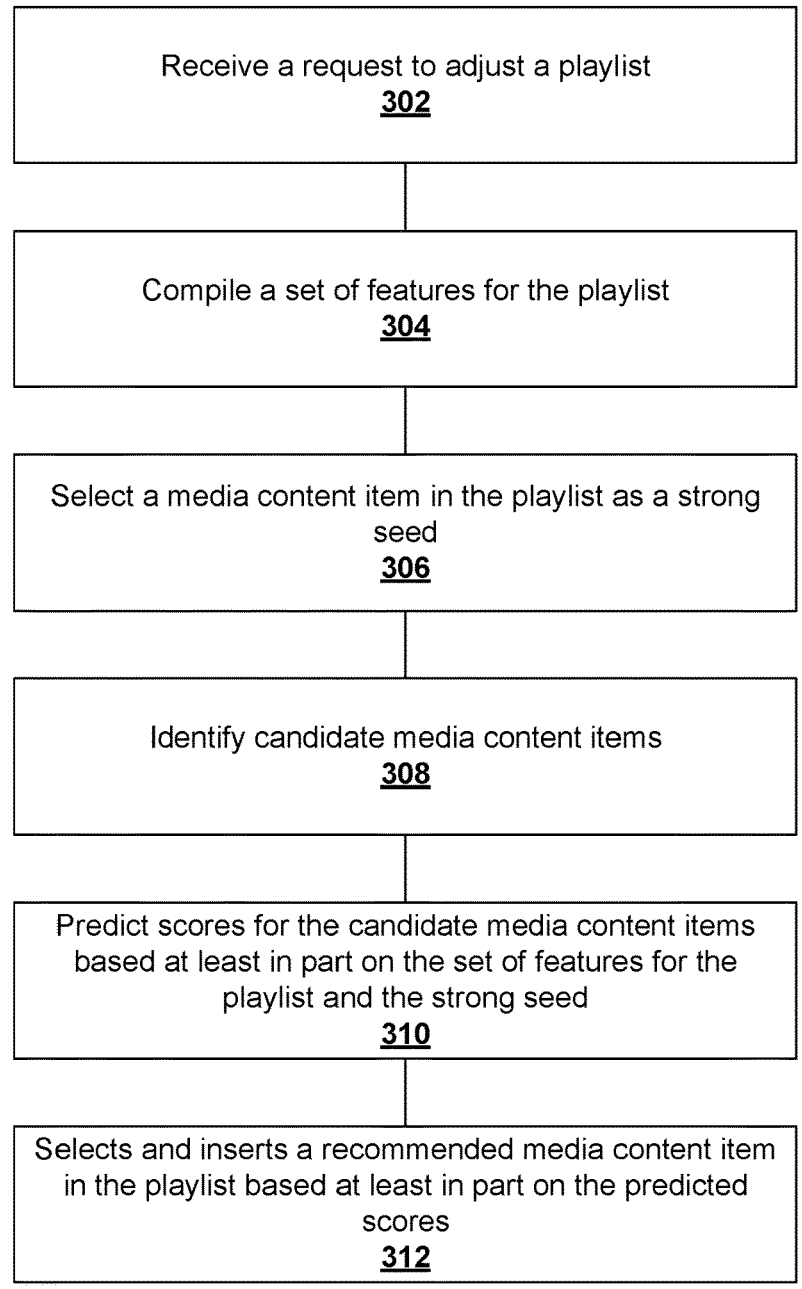
FIG. 3 illustrates an example method for inserting a candidate media content item in a playlist.

FIG. 3 illustrates an example method for inserting a candidate media content item in a playlist. In some embodiments, the method 300 is performed at the playlist adjuster. For example, the playlist adjuster 106 illustrated and described in reference to FIGS. 1, 2, and 4. The method 300 includes the operations 302, 304, 306, 308, 310 and 312.

The operation 302 receives a request to adjust a playlist. The request to adjust the playlist is received from a media playback device. In some embodiments, the request to adjust a playlist includes a playlist ID to retrieve information for the playlist. In typical embodiments, the playlist includes initial media content items. In alternative embodiments, the playlist starts with no media content items.

The operation 304 compiles a set of features for the playlist. In some embodiments, the features include acoustic features and characteristics of media content items in the playlist. The features can include metadata features. For example metadata features about the playlist as a whole and/or individual media content items. In some embodiments, the set of features compiled into a vector representation of the features.

The operation 306 selects a media content item in the playlist as a strong seed. In some embodiments, the strong seed is selected based on past media consumption behavior (e.g., as captured in the logged data) by the user. In some embodiments, the media content item selected as the strong seed is determined based on the last media content item consumed by the user. In some embodiments, a heuristic is used to select a media content item as a strong seed. In some embodiments, multiple strong seeds are selected.

The operation 308 identifies candidate media content items. In some embodiments, the candidate media content items are identified from a database of media content items based at least in part on the set of features for the playlist. In some embodiments, the candidate media content items are identified from past user media content consumption. In some embodiments, the candidate media content items are continuously updated as a user interacts with a playlist. In some embodiments, the candidate media content items are determined using a separate service.

The operation 310 predicts scores for the candidate media content items based at least in part on the set of features for the playlist and the strong seed. In some embodiments, the recommendation engine 240 scores the candidate media content items. In some embodiments, the scores are in a range from 0 to 1 associated with a probability that a user would add the candidate media content item to the playlist. In some embodiments, a machine learning model is used to score the candidate media content items. In some embodiments a wide and deep model is used where features with simple relationships (e.g., features related to the batch data 248 as illustrated and described in reference to FIG. 2) are fed to the wide aspect of the wide and deep model and the features with complex relationships are fed to the deep aspect of the wide and deep model (e.g., the acoustic features in the set of playlist features).

In some embodiments, the machine learning model scores the candidate media content items based on likelihood (e.g., represented from 0 to 1) that a user will add the candidate media content item to the playlist. In some embodiments, model considers the candidate content item (e.g., features of the candidate media content item, meta data for the candidate media content item, etc.) user information, playlist state, playlist features, and/or information on the media content items surrounding the location in the playlist where the recommended media content item is going to be inserted. In some embodiments, the media content items immediately surrounding the location where the recommended media content item are assigned values to indicate the surrounding media content items are strong seeds and the features of these media content items are considered by the machine learning model accordingly. In some embodiments, the machine learning model outputs a score for each of the candidate media content items and the candidate media content items are ranked/ordered accordingly.

The operation 312 selects and inserts a recommended media content item from the candidate media content items based at least in part on the predicted scores for the candidate media content items. In some embodiments, the recommended media content item is selected further based on a location in a playlist the recommended media playback item is to be inserted. For example, based on the features of the media content items before and/or after the location where the recommended media content item is going to be inserted. In some embodiments, the sequencing engine 242 determines which candidate media content items are selected and where to insert the recommended media content items. In some embodiments, the recommended media content item is inserted after the media content item selected as the strong seed. In some alternative embodiments, the scores for each candidate media content item is used as part of a process to sequence all of the tracks in the playlist. In some embodiments, the recommended media content item is selected and inserted to test new media content items where the result is logged and provided for further training of the machine learning model. In some embodiments, a recommended media content item is determined by applying a computational operation (e.g., multiplying) the assigned score with a cosine distance between the seed media content item and the candidate media content item. In some embodiments, the recommended media content item is further determined based on other features, such as artist separation, media content item diversity, etc.

In some embodiments, the method 300 is performed at a server or other computing device which is part of, or configured to interface with, a media delivery system (e.g., the media delivery system 104 illustrated in FIGS. 1 and 2). In some embodiments, a non-transitory computer readable medium, storing instructions which, when executed by a processor, cause the processor to perform the method 300.

Figure 4:
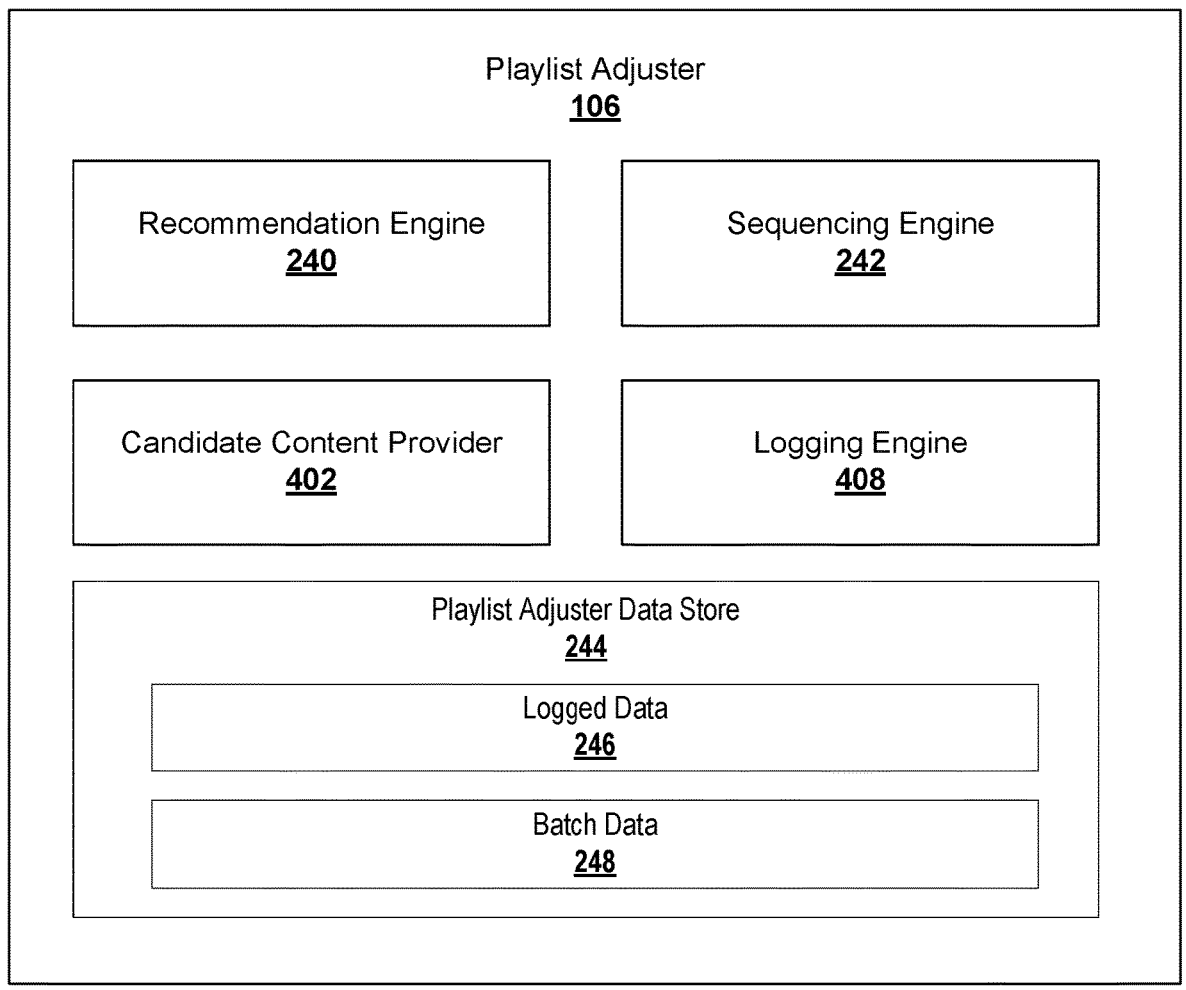
FIG. 4 illustrates an example playlist adjuster.

FIG. 4 illustrates an example playlist adjuster 106. The playlist adjuster includes a recommendation engine 240, a sequencing engine 242, and candidate content provider 402, a logging engine 408 and a playlist adjuster data store 244. The playlist adjuster data store 244 stores logged data 246 and batch data 248. Example system flow diagrams for performing processes of the playlist adjuster 106 are illustrated and described in reference to FIGS. 5-8.

The recommendation engine 240 is another example of the recommendation engine 240 illustrated and described in reference to FIG. 2. The recommendation engine 240 operates to score candidate media content items. In some embodiments, the candidate media content items are identified by the candidate content provider 402. The recommendation engine 240 operates to recommend media content items to add to an existing playlist. In some embodiments, the recommendation engine 240 scores a set of candidate media content items, where the recommended media content items are determined at least in part based on the scores. In some embodiments, the scores are in a range from 0 to 1 associated with a probability that a user would add the candidate media content item to the playlist. In some embodiments, the candidate media content items are scored using a machine learning model. In some embodiments, the machine learning model receives playlists features as an input. In some embodiments, the playlist features are compiled from the information stored in the media data store. An example method 900 for training a machine learning model to score candidate media content items is illustrated and described in reference to FIG. 9 and an example system flow diagram from a process 500 for using the recommendation engine 240 is illustrated and described in reference to FIG. 5.

The sequencing engine 242 is another example of the sequencing engine 242 illustrated and describe in reference to FIG. 2. An example system flow diagram for a process 600 for using the sequencing engine 242 is illustrated and described in reference to FIG. 6. The sequencing engine 242 operates to insert recommended media content items within an existing playlist. In some embodiments, the sequencing engine 242 inserts recommended media content items in a pattern after one or more initial media content items. For example, recommended media content items can be inserted after every third initial media content item in the playlist. In some of these embodiments, the sequencing engine 242 may determine which candidate media content item to insert based on the scores assigned to the media candidate items by the recommendation engine 240. In some embodiments, the sequencing engine 242 further determines where to place recommended media content items based on the tracks surrounding the location where the recommended media content item is being inserted. For example, meta data assigned to the media content items before and after the recommended media content item can be analyzed to determine which candidate media content item should be recommended at a given location in the initial playlist. Examples of media content metadata include characteristics, genre, energy, etc. In some embodiments, the sequencing engine 242 uses a machine learning model to predict optimal candidate media content items to insert at a location. In some embodiments, the sequencing engine 242 determines which location(s) in a playlist recommended media content items should be inserted.

The candidate content provider 402 operates to identify candidate content items. In some embodiments, the candidate content provider 402 identifies candidate media content items based on a set of features for the playlist being adjusted. In some embodiments, the candidate content provider 402 analyzes other user consumption behavior to select candidate media content items. In some embodiments, a computationally light weight model is used to select candidate media content items. In some embodiments, a separate service analyzing the users consumption of media content is used to identify the candidate media content items. An example system flow diagram for a process 700 for using the candidate content provider 402 is illustrated and described in reference to FIG. 7.

The logging engine 408 operates to process and store logged user interaction data. An example system flow diagram for a process 800 using the logging engine 408 is illustrated and described in reference to FIG. 8. In some embodiments, the logging engine 408 processes logged data for storage at the playlist adjuster data store 244. In some embodiments, the logging engine 408 receives logged data from a media playback device, which is already encrypted. In some embodiments, the logging engine 408 encrypts the data before storing the data in the playlist adjuster data store 244. In some embodiments, the logging engine 408 filters or otherwise processes the logged interactions to log only the most relevant interactions.

The playlist adjuster data store 244 is another example of the playlist adjuster data store 244 illustrated and described in reference to FIG. 2. The playlist adjuster data store 244 stores data used by the playlist adjuster 106 including logged data 246 and batch data 248. In some embodiments, the playlist adjuster data store 244 is stored at a specialized computing system for securing the stored data and for compliance with personal data regulation and best practices. In some embodiments, the data stored at the adjuster data store is encrypted with a hash or otherwise anonymized to protect the personal data.

The logged data 246 is another example of the logged data 246 illustrated and described in reference to FIG. 2. The logged data 246 includes logged user interactions with media content items and/or playlists. In some embodiments, the logged data 246 is updated as a user interacts with the media playback application and/or as a user interacts with a particular playlist. This data can be used to continuously train the recommendation engine based on the users actual interactions. In some embodiments, the logged interactions include whether a user added or removed a recommended media content item to a playlist. In some embodiments, the logged data includes other interactions, such as how long the user listened to a particular track, whether the user skipped a track, at what point in a media content item did a user skip or change the output, location where a media content item was listened to, a device connected to the media playback device to output the media content etc. In some embodiments, the machine learning model includes a reinforcement learning process. The reinforcement learning process can include aggregating the logged data and providing the aggregated logged data to the machine learning model to further train the machine learning model to recommend media content items. In some embodiments, the reinforcement learning process is initiated based on a trigger. The trigger can include one or more of (1) periodically based on a predefined period (e.g., daily), (2) a manual trigger, and/or (3) based on the users consumption or interaction history that is derived from the logged data. In some embodiments, a trigger based on interaction history includes when a user skips a certain number of songs to meets a threshold. For example, a user skipping a certain number of songs would indicate that the machine learning model should be retrained based on the updated logged data and consumption behavior.

In some embodiments, the logged data tracks changes to a playlist. For example, the logged data may track a playlist state (e.g., a data structure defining name, media content items included, order of media content items, etc.) and how that state changes over time. In some embodiments, user interactions can be derived or predicted based on changes to the playlist state over time.

The batch data 248 is another example of the batch data 248 illustrated and described in reference to FIG. 2. Examples of batch data 248 includes user language preferences, user location, static account information, user account information etc. In some embodiments, the batch data 248 includes user provided personal preferences.

Although shown together within the playlist adjuster 106 in some embodiments, some or all of the recommendation engine 240, the sequencing engine 242, the candidate content provider 402, logging engine 408, and the playlist adjuster data store 244 are separate services which are interfaces to operate with each other, as well as separately with other media content provider services.

Figure 5:
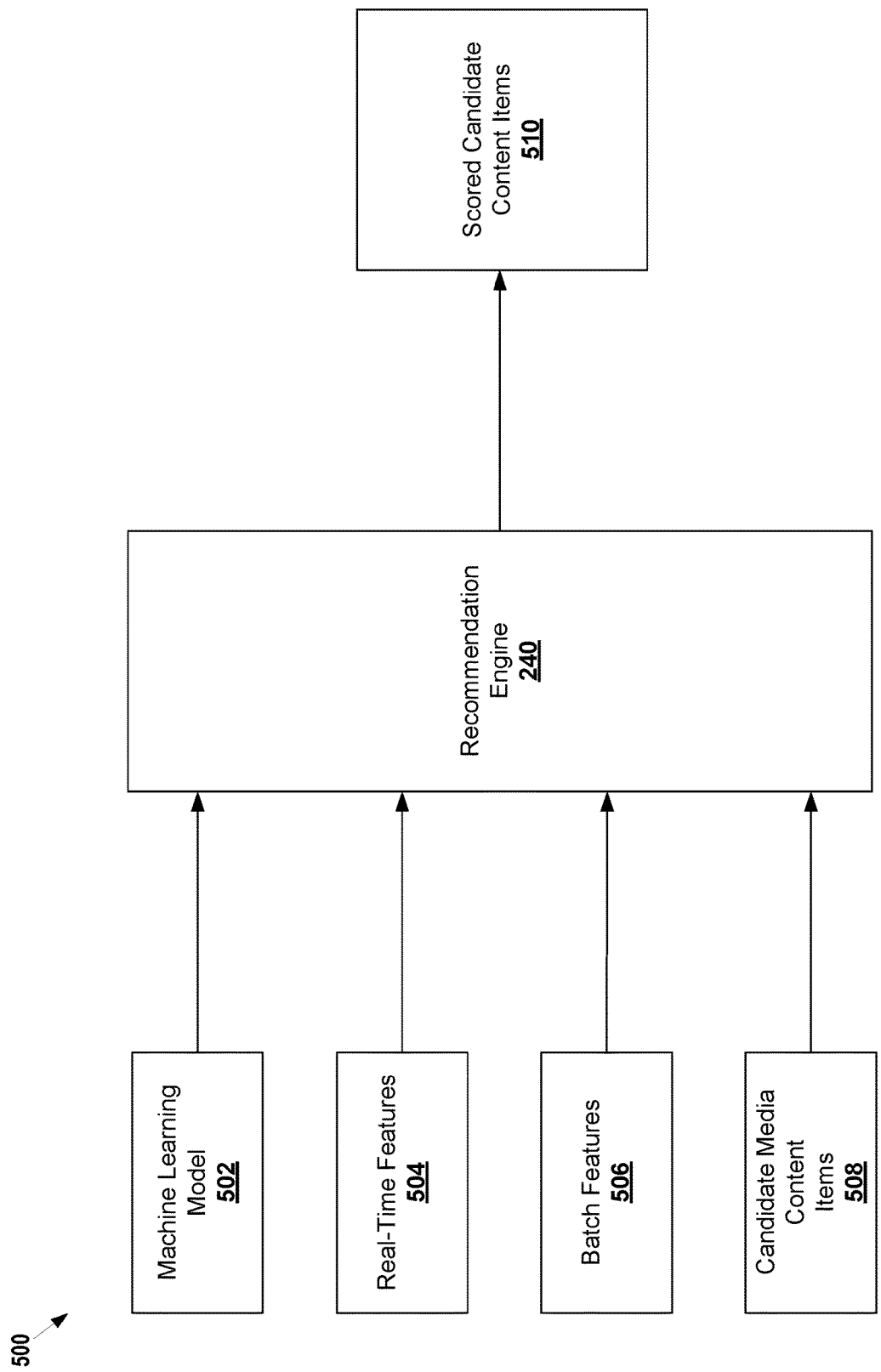
FIG. 5 illustrates a system-flow diagram for operating an example recommendation engine operating within the playlist adjuster of FIG. 4.

FIG. 5 illustrates a system-flow diagram for a process 500 for operating an example recommendation engine 240 operating within the playlist adjuster of FIG. 4. In some embodiments, the recommendation receives as inputs a machine learning model 502, real-time features 504, batch features 506, and candidate media content items 508. The recommendation engine 240 outputs scored candidate content items 510.

The recommendation engine 240 scores candidate media content items 508 using the machine learning model 502. The recommendation engine 240 is another example of the recommendation engine 240 illustrated and described in reference to FIGS. 1, 2, and 3.

The recommendation receives the machine learning model 502 predicts recommendation scores for the candidate media content items 508. In some embodiments, a wide and deep model is used. In some embodiments, the recommendation engine, hosts the machine learning model 502 after the training for the machine learning model 502 is complete. In some embodiments, models are trained as more user interaction data (e.g., interactions derived or predicted from logged data, such as the logged data 246 as shown in FIG. 4) is collected and the recommendation engine receives updates as the machine learning model is further trained. In some embodiments, the updates are received periodically. In some embodiments, the updates are received in real time as the machine learning model is further trained. After the recommendation engine 240 hosts the machine learning model 502, the machine learning model receives the real-time features 504, the batch features 506 and the candidate media content items 508 which are processed by the machine learning model to output the scored candidate media content items 510.

The recommendation engine 240 receives real-time features 504. The real-time features 504 includes features about the current state of a playlist. These features are received in real-time as a user makes updates to the playlist. Updates include adding or removing recommended media content items from the playlist. The real-time features 504 can also include logged user interactions (e.g., a song the user skipped etc.). The real-time features are inputs to the machine learning model used to predict recommendation scores for the candidate media content items 508. For example, features of current content items in a playlist may correspond to features which a user would be interested in for recommended media content items. In some embodiments, when the machine learning model 502 is a wide and deep model the real-time features 504 are the deep features. In some embodiments, the real-time features are retrieved from one or more databases using IDs, such as a playlist ID, media content item ID, user ID etc.

The batch features 506 includes batch data. In some embodiments, the batch data includes information about a language preference for a user, user account information, etc. The batch features 506 are provided to the machine learning model as input variables used to score the candidate media content items 508. In some embodiments, when the machine learning model 502 is a wide and deep model the batch features 506 are wide features. In some embodiments, the batch data is retrieved from one or more databases using a user ID. Other IDs can also be used. In some embodiments, the batch features are retrieved from a batch feature pipeline.

The candidate media content items 508 are a plurality of media content items which are scored by the machine learning model 502. In some embodiments, the candidate media content items are received from the candidate content provider 402 as shown in the example process 700 in FIG. 7.

The recommendation engine outputs scored candidate media content items 510. The score correlates with a likelihood (e.g., represented from 0 to 1) that a user would like to add the candidate media content item to the playlist. In some embodiments, the scored candidate media content items 510 are provided to the sequencing engine 242.

In some embodiments, it is advantageous to pass playlist features and features for strongly seeded media content items instead of features for each media content item because the processing is less computationally expensive. Additionally, in some examples using the strongly seeded media content items results in recommendations which best fit a particular location.

Figure 6:
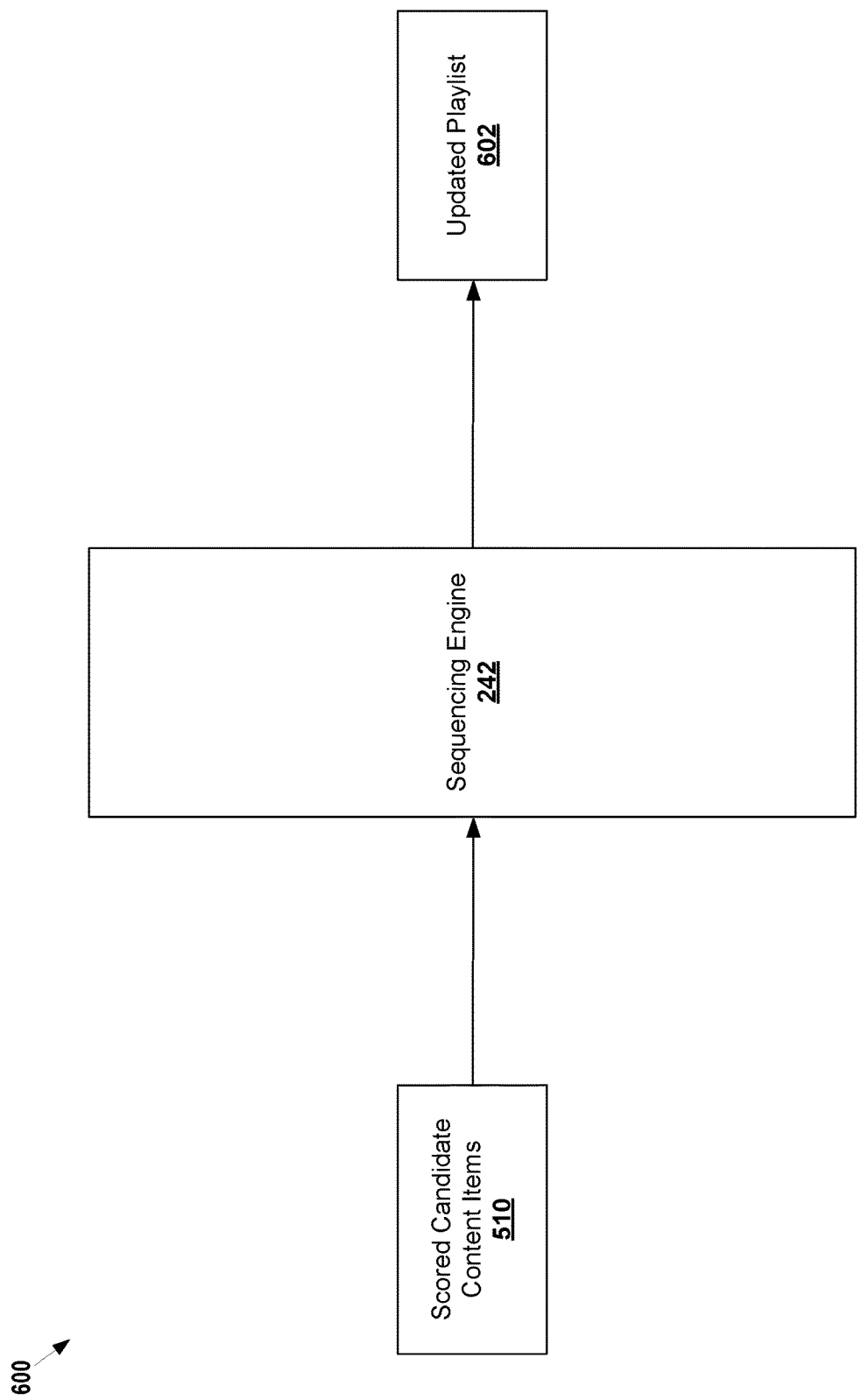
FIG. 6 illustrates a system flow diagram for operating an example sequencing engine operating within the playlist adjuster of FIG. 4.

FIG. 6 illustrates a system flow diagram for operating an example sequencing engine 242 operating within the playlist adjuster of FIG. 4. The sequencing engine 242 receives scored candidate media content items 510 as inputs and outputs an updated playlist 602 or provides information to update a playlist object stored in a database.

In some embodiments, the sequencing engine 242 receives scored candidate media content items 510 from the recommendation engine (e.g., the recommendation engine 240 as shown in FIG. 5). The scores corresponding to a likelihood that the user will add a candidate content item to the playlist.

The sequencing engine 242 operates to select one or more recommended media content items recommendation and inserts the selected recommended media content items in the existing playlist. The recommended media content items are selected from the scored candidate media content items 510 based at least in part on the scores assigned the candidate content items. In some embodiments, the recommended media content items are selected further based on the media content items before and/or after the insertion location in the initial playlist. In some embodiments further modeling (e.g., machine learning model or heuristic) is used to determine where to insert recommended media content items and/or to select a recommended media content item from the scored candidate media content items 510. Examples of the sequencing engine 242 are illustrated and described in reference to FIGS. 2 and 4.

The sequencing engine 242 outputs an updated playlist 602 or information to update an existing playlist. The updated playlist includes the one or more recommended media content item interleaved with the initial media content items in the playlist. In some embodiments the updated playlist 602 is provided the media delivery system and/or the media playback device the requesting user.

In some embodiments, the sequencing engine considers various constraints for selecting a recommended media content item. For example, one constraint could limit the number of songs by a single artist that are recommended. Other features can also be constrained (e.g., by type of genre, etc.).

Figure 7:
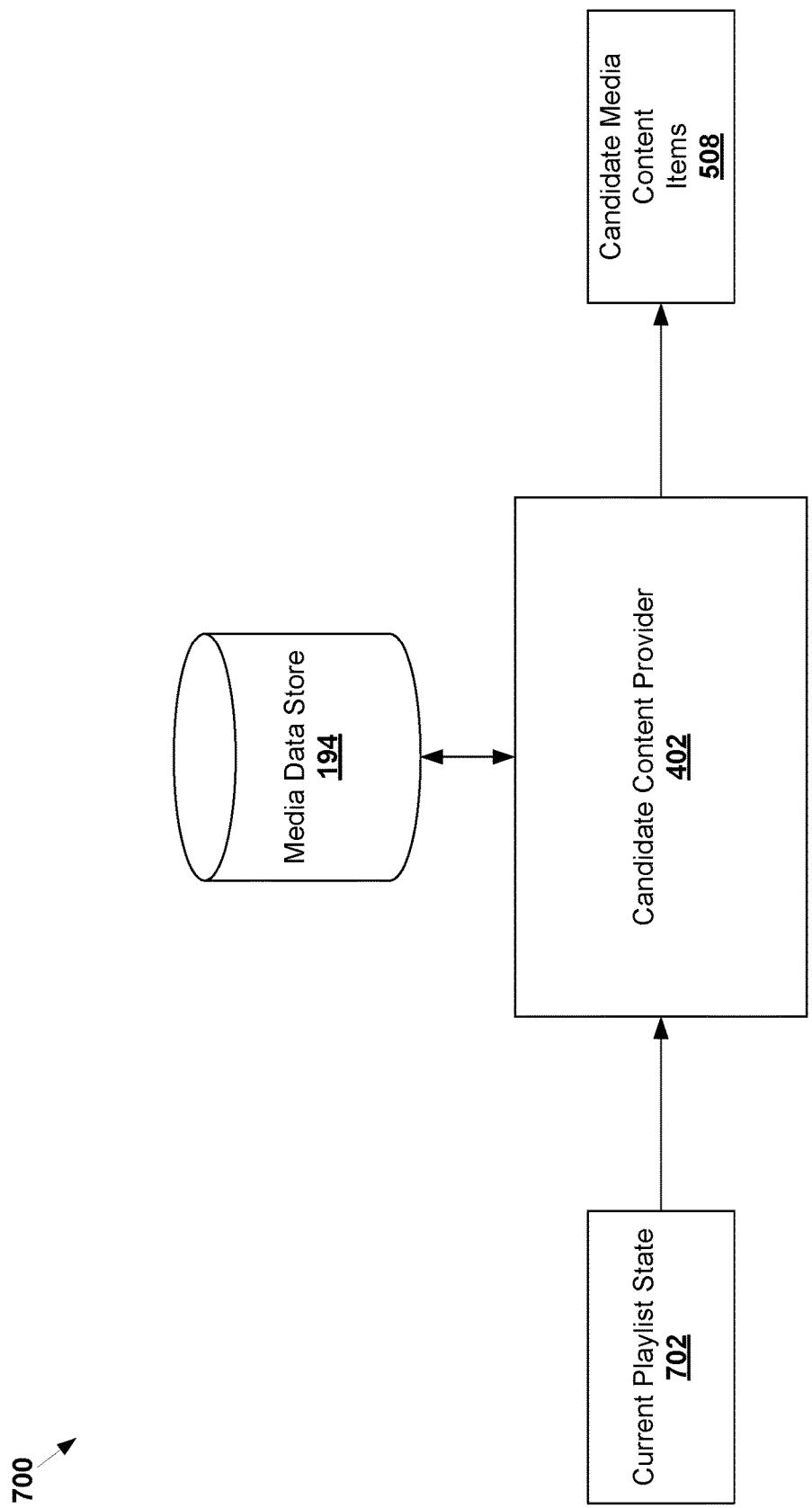
FIG. 7 illustrates a system flow diagram for operating an example candidate content provider within the playlist adjuster of FIG. 4.

FIG. 7 illustrates a system flow diagram for a process 700 for operating an example candidate content provider 402 within the playlist adjuster of FIG. 4. In some embodiments, the candidate content provider 402 receives a current playlist state 702 as inputs and outputs candidate media content items 508. The candidate content provider 402 interfaces with a media data store 194 to identify and retrieve information for the candidate media content items 508.

In some embodiments, the candidate content provider 402 receives a current playlist state 702 from a playlist stored at the media data store 194, wherein a request to adjust the playlist is requested from a media delivery device. The current playback state is analyzed to identify candidate media content items which are likely to fit in with the existing playlist. For example, a genre, an energy, acoustic features, etc. of media content items in the initial playlist is likely indicative of other media content items which a user may like to add to the initial playlist. In some embodiments, the candidate content provider also receives user characteristics or user consumption behavior data to identify the candidate media content items 508.

The candidate content provider 402 operates to identify candidate media content items 508 from a collection of media content items stored at the media data store 194. In some embodiments, the candidate content provider works with another service to identify the candidate media content items. In some embodiments, the candidate content provider is continuously updated as the current playlist state is updated by the user. The candidate media content items 508 are provided to the recommendation to be scored to determine a likelihood a user would add a candidate media content item to the playlist. For example, the likelihood may correspond to a score between 0 and 1.

In some embodiments, the candidate content provider 402 considers all media content items in the current playlist and retrieves a set of candidate media content items ordered by similarity to the media content items currently in the playlist. For example, the candidate content provider 402 can retrieve 200 candidate media content items (or any other number of candidate media content items) from the media data store 194. In some embodiments, the candidate content provider 402 retrieves candidate media content items based on the media content item or items in the initial playlist that is selected as the strong seed. In some embodiments, the candidate content provider 402 balances selecting candidate media content items which are most similar to the playlist as a whole with a strong seed media content item or a plurality of strongly seeded candidate items (e.g., a strongly seeded candidate pool). Considering strongly seeded media content items allows the candidate media content provider to identify more candidate media content items.

Figure 8:
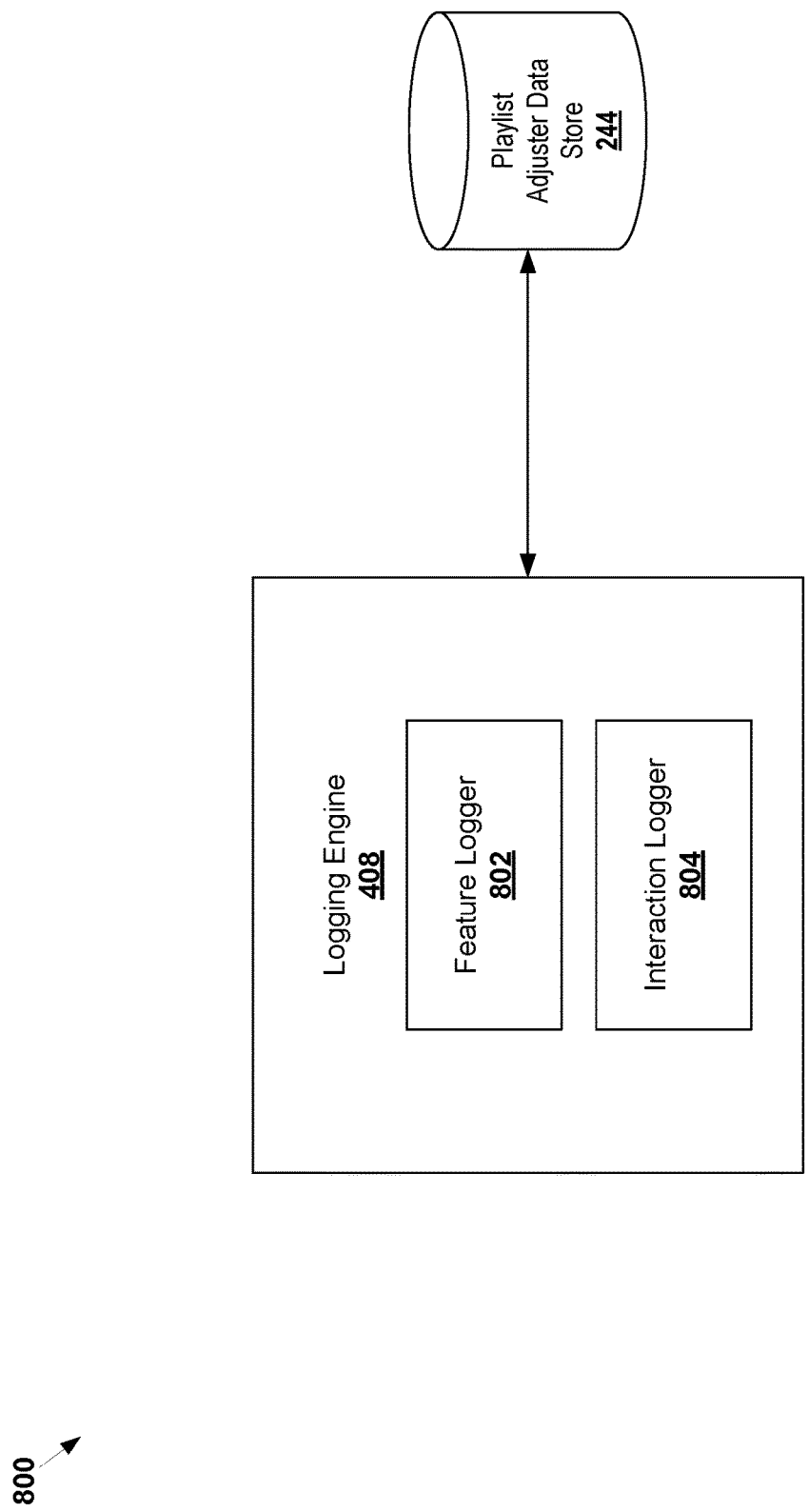
FIG. 8 illustrates a system flow diagram for operating an example logging engine within the playlist adjuster of FIG. 4.

FIG. 8 illustrates a system flow diagram for a process 800 for operating an example logging engine 408 within the playlist adjuster of FIG. 4. The logging engine 408 includes a feature logger 802 and interaction logger 804. The logging engine 408 stores the logged information in the adjuster data store.

An example of the logging engine 408 is illustrated and described in reference to FIG. 4. The logging engine 408 receives logged interactions and logged features from media playback devices. In some embodiments, the logging engine 408 is a server-side service which processes user inputs such that the logged data can be used to train a machine learning model to predict recommended media content items.

The feature logger 802 logs features for the playlist. In some embodiments, the feature logger tracks changes to the playlist features over time. This data can be used to further train the machine learning model to predict recommended media content items. In some embodiments, the feature logger 802 tracks a state of playlist as interactions are received and logged by the interaction logger 804.

The interaction logger 804 processes and logs interactions with the media playback application. The interaction logger 804 processes logged interactions of a user with media content items in the playlist. In some embodiments, the interaction logger 804 tracks whether a user added or removed a recommended media content item from the playlist.

The playlist adjuster data store 244 stores the logged data. Examples of the playlist adjuster data store 244 are illustrated and described in reference to FIGS. 2 and 4. In some embodiments, the machine learning model is trained based on states of a playlist and how the interactions with the playlist change the state of the playlist over time.

Figure 9:
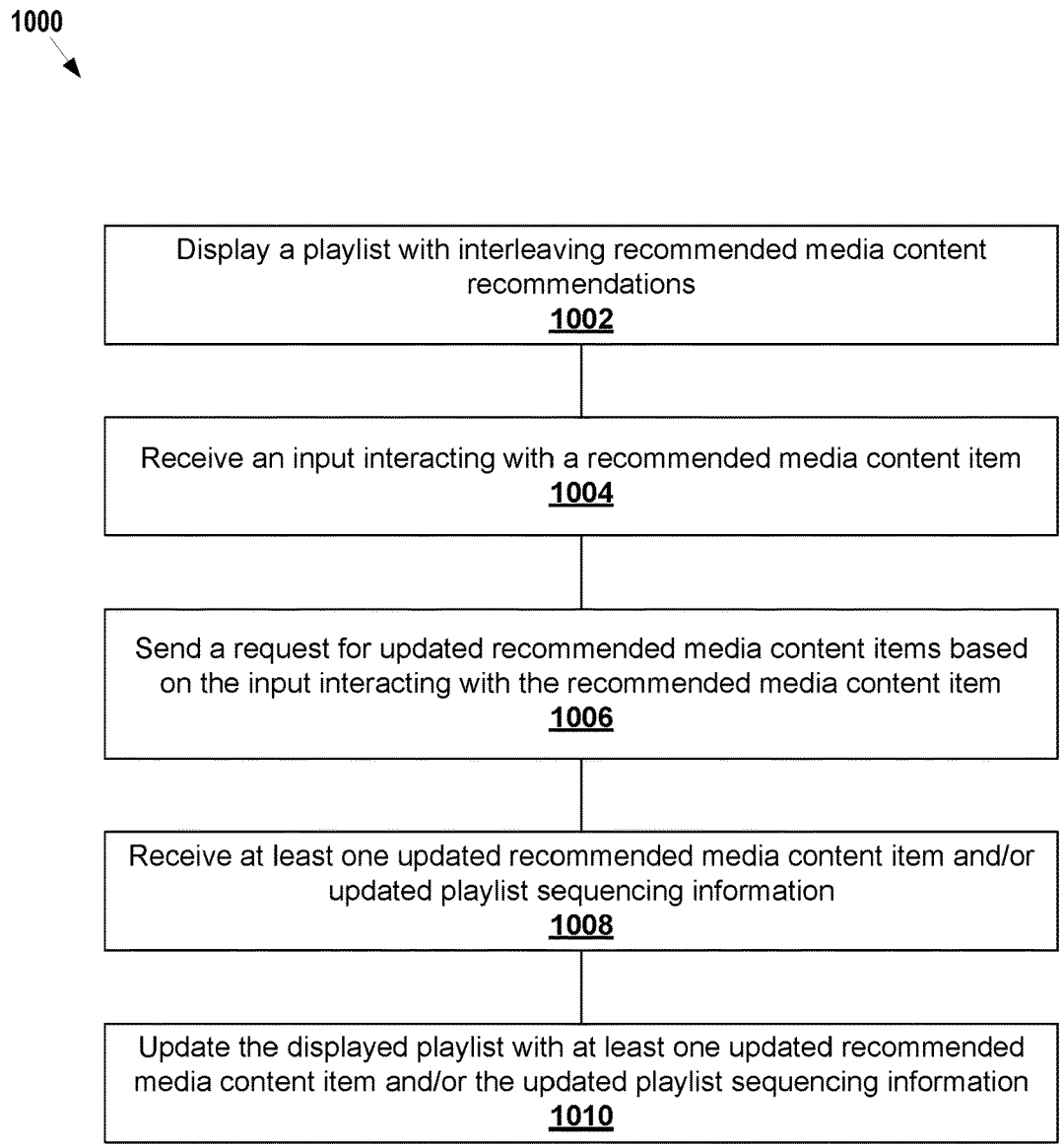
FIG. 9 illustrates an example method for training a machine learning model to recommend candidate media content items.

FIG. 9 illustrates an example method 900 for training a machine learning model to recommend candidate media content items. The method 900 includes the operation 902, 904, 906 908, 910, and 912.

The operation 902 labels training media content items, wherein at least one training content item is labeled based on logged user interaction data. In some embodiments, a user selects a control to add or remove a media content item from the playlist. This interaction is logged to add positive and negative training examples. For example, if a user selects a control to add a media content item to a playlist the added media content item is labeled as a positive training example and if a user selects a control to remove a media content item from the playlist the removed media content item is labeled as a negative training example. Other interactions with media content items can be used to label media content items. For example, if a user consumes a media content item for a certain amount of time the media content item can be labeled as a positive training example and if a user quickly skips a media content item, the media content item can be labeled as a negative training example.

The operation 904 receives logged features for the user. The logged features include information on what media content the user is interacting with, what media content items the user is adding to playlists, and/or what curated playlists the user is consuming or downloading.

The operation 906 receives batched data for the user. The batched data includes static features related to the user. For example, the user's language preferences, account information, etc. In some embodiments, the batch data includes personal preferences provided by the user.

The operation 908 trains a model to predict scores related to the assigned labels for the training content items based on the training media content item, logged features for the user, and the batched data for the user. The model can be continuously trained as a user uses the playlist adjuster to add or remove media content items from a playlist. In some embodiments, the model predicts the likelihood that the user will add a candidate media content item to the playlist based on the candidate media content item, user information, playlist features, and surrounding tracks in the playlist. In some embodiments, the machine learning model scores each of a plurality of candidate media content items and ranks the candidate media content items based on predicted scores.

The operation 910 host the trained model within the recommendation engine. Once the model is trained it is hosted at the trained model at the recommendation engine to make predictions for recommending media content items to add to a playlist. In some embodiments, the machine learning model is updated daily with the updated model hosted to the recommendation engine daily. Other frequencies for updating and hosting the machine learning model can also be used (e.g., hourly, weekly, etc.). In some embodiments, the machine learning model can be used for other media delivery services. For example, a streaming radio service and/or for recommending media content items outside of a given playlist.

In some embodiments, the method 900 repeats periodically and/or in near-real time as more user interaction data is logged, as shown by the operation 912. In alternative embodiments, the method 900 repeats periodically (e.g., hourly, daily, weekly, monthly, etc.)

Figure 10:
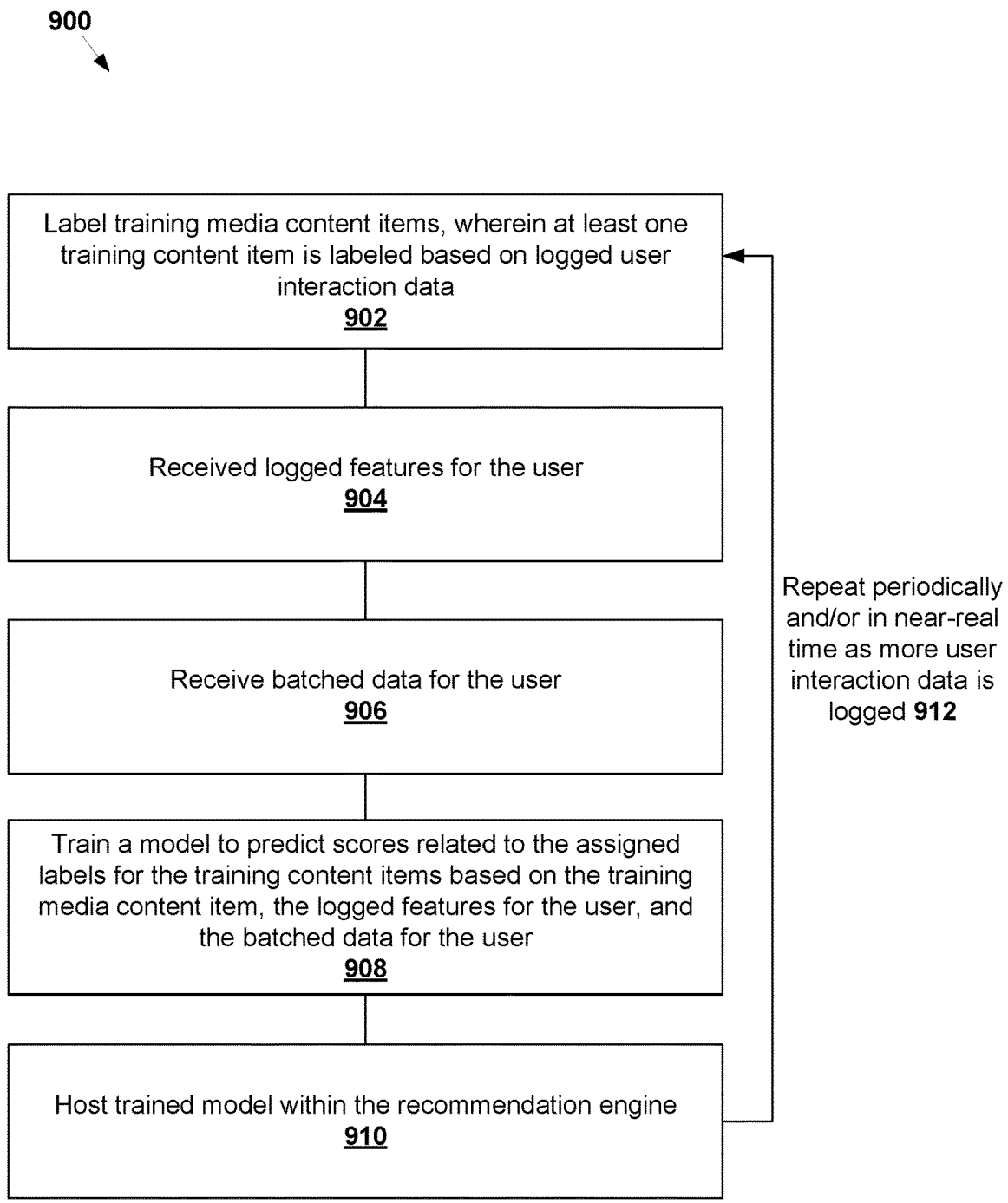
FIG. 10 illustrates an example method for using the playlist adjuster to adjust a playlist.

FIG. 10 illustrates an example method 1000 for using the playlist adjuster to adjust a playlist. The method 1000 includes the operations 1002, 1004, 1006, 1008, and 1010.

The operation 1002 displays a playlist with interleaving recommended media content recommendations. In some embodiments, the recommended media content items are presented with an add control and a remove control.

The operation 1004 receives an input interacting with the recommended media content item. In some embodiments, the input interacting with the recommended media content item is a user selecting the add control or the remove control. In some embodiments, the input interacting with the recommended media content item includes a length of time the user consumed the recommended media content item, whether the user skipped the media content item, or saved the item to another playlist, etc.

The operation 1006 sends a request for updated recommended candidate content recommendations based on the input interacting with recommended media content item. In some embodiments, if the user selects an add control, the request is sent for additional recommendations similar to the added media content item. In some embodiments, if a user selects the remove control, a request for a new media content recommendation is sent. The updated recommended media content items are received at the operation 1108.

In some embodiments, the operation 1008 receives at least one updated recommended media content item and/or updated playlist sequencing information. The sequencing information can include locations in the playlist to insert the recommended media content item.

The operation 1010 updates the displayed playlist with the at least one updated recommended media content item and/or the updated playlist sequencing information. In some embodiments, the updated recommended media content item is displayed with an add control and a remove control to further facilitate the expansion of the playlist.

Figure 13:
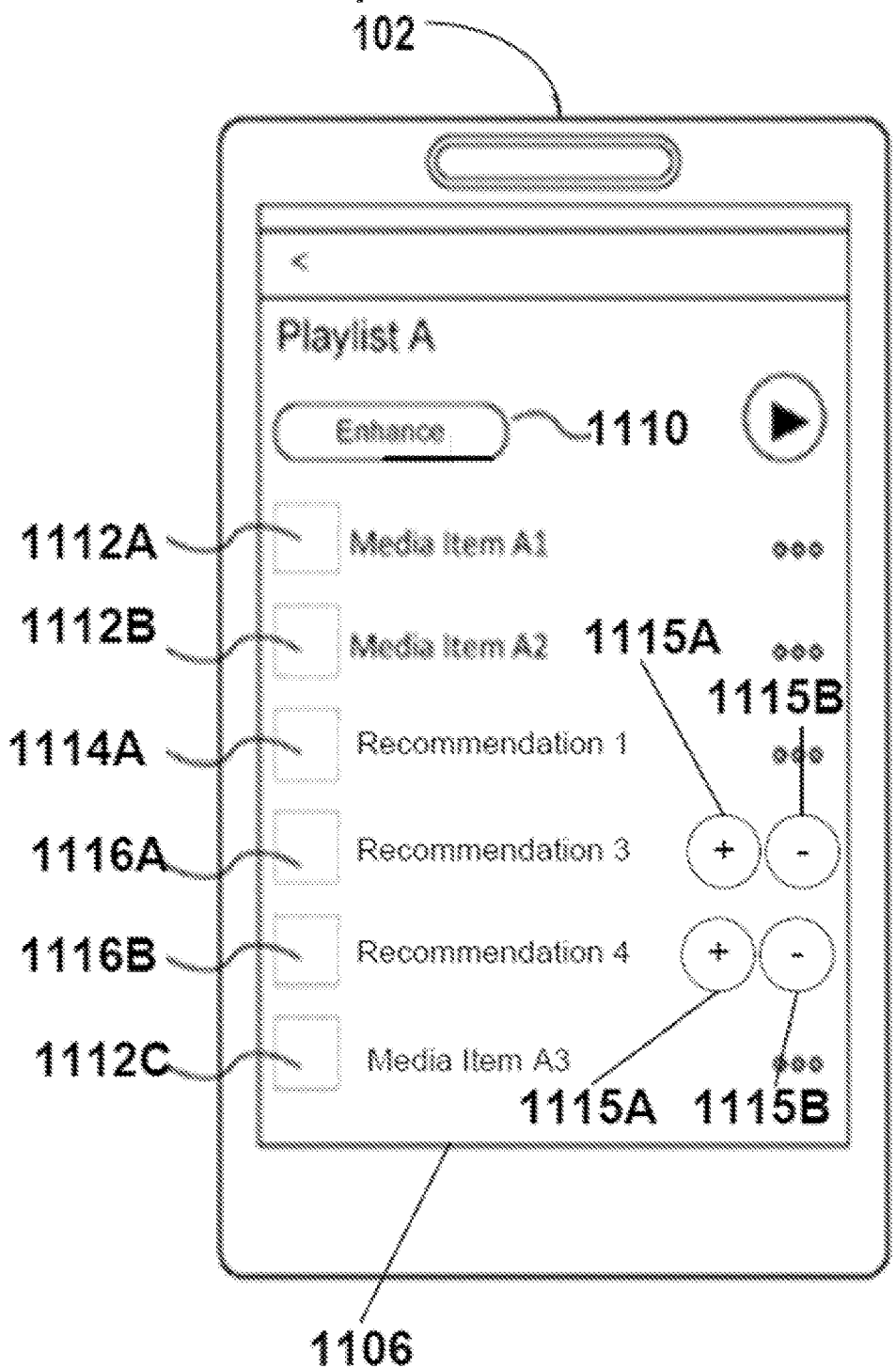
FIG. 13 illustrates an example user interface of a media-playback application presenting additional media content items recommended by the playlist adjuster.

FIGS. 11-13 illustrates example user interfaces for a media-playback application configured to operate with the playlist adjuster. FIG. 11 illustrates the example user interfaces 1102, FIG. 12 illustrates the example user interface 1104, and FIG. 13 illustrates the example user interface 1016. In the example shown, the user interfaces are displayed on the media playback device 102. The user interfaces include an adjust playlist button 1110 which can toggle the user interface between a standard playlist (e.g., as shown in the user interface 1102 in FIG. 11) and an adjusted playlist (e.g., as shown in the user interface 1104 in FIG. 12).

The user interface 1102 (shown in FIG. 11) presents a playlist with an initial set of media content items (e.g., the initial media content items 1112A, 1112B, 1112C, 1112D, 1112D, 1112E, and 1112F). Additional initial media content items can be viewed by scrolling through the list of media content items.

When a user selects the adjust playlist button 1110 the user interface 1104, shown in FIG. 12, is presented. The user interface 1104 presents the playlist with the initial media content items with recommended media content items 1114A and 1114B. The recommended media content items 1114A and 1114B are presented with an add control 1115A and a remove control 1115B. In some embodiments, a machine learning model re-ranks recommended media content items each time the adjust playlist button 1110 is toggled to move the playlist into an adjusted state.

In some embodiments, when a user selects the add control 1115 for the recommended media content item 1114A the user interface 1106 (shown in FIG. 13) is displayed. The user interface 1106 displays a playlist which includes the initial media content items and the recommended media content items with additional media content items 1116A and 1116B which are displayed with the add control 1115A and the remove control 1115B. In the embodiment shown, two additional media content items 1116A and 1116B are presented immediately below recommended media content item 1114A. However, when a user adds a recommended media content item any number of additional recommendations media content items can be displayed below the added media content item.

In some example embodiments, a user selects a user curated playlist (or another playlist). Next the user selects an input to adjust the playlist which interleaves recommendations with the media content items in the playlist. In some embodiments, recommendations are interleaved every two media content items. In some embodiments, the cadence for interleaving recommended media content items can be different and possibly change over time. In some embodiments, the recommendations can be added to the playlist via an add control (e.g., a "+" button) or removed from the playlist with a remove control (e.g., a "−" button). In some embodiments, when a user adds a recommended media content item to the playlist an additional set of recommendations are interleaved. In some embodiments, when a user is done with adjusting a playlist the user can toggle the adjust playlist button to finalize the playlist. In some embodiments, the playlist can be played in an playlist adjusting state and a default state.

In some embodiments, only an add control is displayed. In some of these embodiments, a remove action may be inferred based on the users interactions with the playlist. In some embodiments, only a remove control is displayed. In some of these embodiments, the add action may be inferred based on the users interactions with the playlist.

In some embodiments, a user interface displaying the current media content item being output is displayed. This user interface can include an add control and a remove control and interactions with these controls can be used to train the machine learning model.

The embodiments disclosed herein can be performed analogously with a current or upcoming playback queue, instead of with a playlist. For example, the upcoming media content items in the queue may operate as a temporary playlist where recommended media content items may be determined based on the features of the queue and interleaved in the upcoming playback queue.

As used herein, the term "engine" is applied to describe a specific structure for performing specific associated functions, such as a special purpose computer as programmed to perform algorithms (e.g., processes) disclosed herein. The engine can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Where data structures are referred to, the data structure can be stored on dedicated or shared computer readable mediums, such as volatile memory, non-volatile, transitory, or non-transitory memory.

Aspects of the present description may also be described by the following examples.

Example 1 is a method of adjusting a playlist of media content items, the method comprising: receiving a selection of a playlist including initial media content items arranged in a particular order; receiving an input requesting that the playlist be adjusted; interleaving recommended media content items into the initial media content items; and simultaneously displaying, for the recommended media content items, an add control and a remove control, wherein the add control is selectable to add a respective recommended media content item to the playlist, and wherein the remove control is selectable to remove the respective recommended media content item.

Example 2 is the method of example 1, wherein the recommended media content items are provided by a trained machine learning model.

Example 3 is the method of example 1, wherein the machine learning model is trained using labeled training data, wherein the labeled training data includes the recommended media content items in which the add control was selected as positive training examples, and the recommended media content items in which the remove control was selected as negative training examples.

Example 4 is the method of example 3, further comprising: after the add control is selected, using the machine learning model to identify additional recommended media content items; and displaying the additional recommended media content items in the playlist.

Example 5 is the method of example 3, further comprising: receiving a user input removing the recommendations and requesting a new set of recommendations; removing any of the recommended media content items that have not been added to the playlist; selecting the new set of recommendations using the trained machine learning model based on the user's prior selections of the add or remove controls associated with the recommended media content items; and interleaving the new set of recommendations into the playlist.

Example 6 is the method of example 3, wherein the machine learning model is configured to perform scoring, ranking, and sequencing of media content items.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of adjusting a playlist comprising initial media content items, the method comprising:
   while playing back a media content item of the initial media content items in the playlist, receiving an input requesting to include one or more recommendations in the playlist comprising the initial media content items;
   in response to receiving the input requesting the playlist include one or more recommendations:
      compiling a set of acoustic features for the initial media content items; and selecting a strong seed media content item from the initial media content items that is selected based on past media consumption behavior;

predicting scores for a plurality of candidate media content items using the compiled set of acoustic features for the playlist and the selected strong seed media content item, the scores indicating a likelihood that a corresponding candidate media content item will be added by a user to the playlist; and displaying one or more of the plurality of candidate media content items as interleaved within the playlist, including inserting a candidate media content item of the one or more of the plurality of candidate media content items after the strong seed media content item within the playlist based at least in part on the scores predicted for the plurality of candidate media content items, wherein each candidate media content item of the one or more of the plurality of candidate media content items is displayed with an add control for the user to add the respective candidate media content item to the playlist.

2. The method of claim 1, wherein the scores for the plurality of candidate media content items are predicted using a machine learning model.

3. The method of claim 2, wherein the machine learning model is trained based at least in part on logged user interaction data.

4. The method of claim 2, wherein the machine learning model is trained using labeled training data, wherein the labeled training data includes previously recommended media content items in which an add control was selected as positive training examples, and the previously recommended media content items in which a remove control was selected as negative training examples.

5. The method of claim 2, wherein the machine learning model is continuously trained and updated in near real-time based on logged user interaction data.

6. The method of claim 1, further comprising:
receiving an add selection on the add control from a user to add the inserted candidate media content item to the playlist;
recompiling the set of acoustic features for the playlist with the initial media content items and the inserted candidate media content item and selecting the inserted candidate media content item as an updated strong seed media content item;
predicting scores for an updated plurality of candidate media content items based at least in part on the recompiled set of acoustic features for the playlist and the updated strong seed media content item; and
inserting one or more of the updated plurality of candidate media content items after the inserted candidate media content item selected as the updated strong seed media content item, based at least in part on the scores predicted for the updated plurality of candidate media content items.

7. The method of claim 1, further comprising:
receiving a user input removing the inserted candidate media content item;
selecting an updated strong seed media content item from the initial media content items;
predicting scores for an updated plurality of candidate media content items based at least in part on the set of acoustic features for the playlist and the updated strong seed media content item; and
inserting an updated candidate media content item of the updated plurality of candidate media content items after the updated strong seed media content item based at least in part on the scores predicted for the updated plurality of candidate media content items.

8. The method of claim 1, wherein the set of acoustic features are compiled in a vector representing the set of acoustic features.

9. The method of claim 1, wherein the plurality of candidate media content items are determined based at least in part on the set of acoustic features for the playlist.

10. The method of claim 9, wherein the plurality of candidate media content items are further determined based on user features associated with a user account requesting to adjust the playlist.

11. The method of claim 1, wherein the predicted scores relate to a probability that a user will add or listen to a corresponding candidate media content item.

12. The method of claim 1, further comprising:
applying to a playlist sequencer to interleave one or more of the plurality of candidate media content items within the playlist based at least in part on the scores predicted for the plurality of candidate media content items.

13. The method of claim 12, wherein the playlist sequencer includes a second machine learning model trained to predict optimal locations to insert candidate media content items.

14. The method of claim 1, further comprising:
generating a user interface (UI) displaying the playlist, wherein the inserted candidate media content item is presented in a panel with the add control and a remove control, wherein the add control is selectable to add the inserted candidate media content item to the playlist, and wherein the remove control is selectable to remove the inserted candidate media content item from the playlist.

15. A media playback system comprising:
one or more servers configured to operate a playlist adjuster, the playlist adjuster configured to:
while playing back a media content item of initial media content items in a playlist, receive, from a media playback device, a request to include one or more recommendations in the playlist comprising the initial media content items;
retrieve a set of acoustic features for the initial media content items in the playlist, a strong seed media content item associated with one of the initial media content items that is selected based on past media consumption behavior, and a plurality of candidate media content items;
predict scores for the plurality of candidate media content items using the retrieved set of acoustic features for the playlist and the strong seed media content item, wherein the scores indicate a likelihood that a corresponding candidate media content item will be added by a user to the playlist; and
provide, to the media playback device, one or more of the plurality of candidate media content items to be interleaved within the playlist, including a candidate media content item of the plurality of candidate media content items and a location within the playlist to insert the candidate media content item.

16. The media playback system of claim 15, wherein the playlist adjuster is further configured to:
call a playlist sequencer to determine the location within the playlist to insert the candidate media content item.

17. The media playback system of claim 15, wherein the scores for the plurality of candidate media content items are predicted using a machine learning model.

18. A media playback device comprising:
at least one processor; and
a memory storing instructions which, when executed by the at least one processor, cause the media playback device to:
generate a user interface (UI) to display a playlist comprising initial media content items and a playlist control to include one or more recommendations in the playlist;
while playing back a media content item of the initial media content items in the playlist, receive an input, at the UI, selecting the playlist control;
send, to a media playback system, a request to include one or more recommendations in the playlist, wherein the media playback system is configured to:
compile a set of acoustic features for the initial media content items playlist;
select a strong seed media content item from the initial media content items that is selected based on past media consumption behavior; and
predict scores for a plurality of candidate media content items using the compiled set of acoustic features for the playlist and the selected strong seed media content item and insert a candidate media content item from the plurality of candidate media content items in the playlist, wherein the scores indicate a likelihood that a corresponding candidate media content item will be added by a user to the playlist;
receive, from the media playback system, the playlist with the inserted candidate media content item; and
update the UI to display one or more of the plurality of candidate media content items as interleaved within the playlist, including displaying the playlist with the inserted candidate media content item, wherein each candidate media content item of the one or more of the plurality of candidate media content items is displayed with an add control for the user to add the respective candidate media content item to the playlist.

19. The media playback device of claim 18, wherein the UI displays the inserted candidate media content item with the add control and a remove control, wherein the add control is selectable to add the inserted candidate media content item to the playlist, and wherein the remove control is selectable to remove the inserted candidate media content item from the playlist.

20. The media playback device of claim 18, wherein the scores for the plurality of candidate media content items are predicted using a machine learning model.

* * * * *